United States Patent
Yanagihara

(10) Patent No.: US 11,062,681 B2
(45) Date of Patent: Jul. 13, 2021

(54) MONITORING SYSTEM, DATA MODEL MANAGEMENT DEVICE, AND METHOD OF GENERATING DISPLAY DATA

(71) Applicant: Mitsubishi Electric Corporation, Tokyo (JP)

(72) Inventor: Shintaro Yanagihara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 118 days.

(21) Appl. No.: 16/347,297

(22) PCT Filed: Jan. 26, 2017

(86) PCT No.: PCT/JP2017/002829
§ 371 (c)(1),
(2) Date: May 3, 2019

(87) PCT Pub. No.: WO2018/096694
PCT Pub. Date: May 31, 2018

(65) Prior Publication Data
US 2019/0287488 A1    Sep. 19, 2019

(30) Foreign Application Priority Data

Nov. 25, 2016  (JP) .............................. JP2016-228684

(51) Int. Cl.
G09G 5/30      (2006.01)
G05B 23/02     (2006.01)
G06F 3/0481    (2013.01)

(52) U.S. Cl.
CPC .............. *G09G 5/30* (2013.01); *G05B 23/02* (2013.01); *G06F 3/0481* (2013.01); *G09G 2354/00* (2013.01)

(58) Field of Classification Search
CPC .................................. G09G 5/30; G05B 23/02
(Continued)

(56) References Cited

U.S. PATENT DOCUMENTS 7,940,685 B1 *  5/2011  Breslau .................. H04L 43/12
                                                   370/251
10,013,571 B2 *  7/2018  Tomoeda .............. H04L 63/107
(Continued)

FOREIGN PATENT DOCUMENTS

JP    H0447425 A    2/1992
JP    H10320005 A   12/1998
(Continued)

OTHER PUBLICATIONS

International Search Report (with English translation) and Written Opinion issued in corresponding International Patent Application No. PCT/ PCT/JP2017/002829, 6 pages (dated Apr. 18, 2017).

*Primary Examiner* — Prabodh M Dharia
(74) *Attorney, Agent, or Firm* — Buchanan Ingersoll & Rooney PC

(57) ABSTRACT

A monitoring system includes a monitoring device to collect and retain the monitoring information item that is a result of monitoring by a monitor terminal, a configuration information item management device to retain a configuration information item that is information about the monitor terminal connected to the monitoring system, a data model management device to generate display data intended for display of the monitoring information item by means of a data model that includes information associating the monitoring information item with the configuration information item, and a display device to obtain the display data and control the display of the monitoring information item.

16 Claims, 20 Drawing Sheets

(58) Field of Classification Search
USPC .......................................... 345/418; 709/224
See application file for complete search history.

(56) References Cited

U.S. PATENT DOCUMENTS

| | | | | |
|---|---|---|---|---|
| 2006/0291446 | A1* | 12/2006 | Caldwell | H04L 45/42 370/351 |
| 2006/0291473 | A1* | 12/2006 | Chase | H04L 43/16 370/395.5 |
| 2011/0016212 | A1* | 1/2011 | Matsumoto | H04L 12/40013 709/224 |
| 2016/0267417 | A1* | 9/2016 | Tomiyama | G06Q 10/06313 |
| 2018/0096028 | A1* | 4/2018 | Masekera | G06F 16/2462 |

FOREIGN PATENT DOCUMENTS

| | | | |
|---|---|---|---|
| JP | 2000156712 | A | 6/2000 |
| JP | 2008009861 | A | 1/2008 |
| JP | 2011100263 | A | 5/2011 |

\* cited by examiner

FIG.2

| MONITORING INFORMATION ITEM ID | MEASURED VALUE | MEASUREMENT TIME POINT |
|---|---|---|
| sig0001 | 100.00 | 2010/01/01 12:00:00 |
| sig0004 | 0.00 | 2010/01/01 12:00:00 |
| sig0001 | 23.45 | 2016/08/31 08:30:00 |
| sig0001 | 33.00 | 2016/09/01 12:00:00 |

FIG.3

| TERMINAL ID | STATUS | LATEST CHECK TIME POINT |
|---|---|---|
| eqp001 | STOP | 2016/08/31 08:30:00 |
| eqp002 | IN OPERATION | 2016/08/31 08:00:00 |
| eqp003 | IN OPERATION | 2016/08/31 08:00:00 |
| eqp004 | IN OPERATION | 2016/08/31 08:30:00 |

FIG.4

| MONITORING UNIT ID | MONITORING INFORMATION ITEM ID | TERMINAL ID | OPERATION START TIME POINT | OPERATION FINISH TIME POINT |
|---|---|---|---|---|
| PC001 | sig0001 sig0002 sig0003 | eqp001 | 2010/01/01 12:00:00 | 2016/08/31 08:30:00 |
| | sig0001 sig0002 | eqp002 | 2016/08/31 08:00:00 | – |
| | sig0003 | eqp003 | 2016/08/31 08:00:00 | – |
| PC002 | sig0004 | eqp004 | 2010/01/01 12:00:00 | – |

| TIME POINT | VOLTAGE 1 | ELECTRIC CURRENT 1 | ELECTRIC ENERGY 1 |
|---|---|---|---|
| t1 | aa1 | bb1 | cc1 |
| t2 | aa2 | bb2 | cc2 |
| t3 | aa3 | bb3 | cc3 |
| t4 | aa4 | bb4 | cc4 |
| t5 | aa5 | bb5 | cc5 |
| t6 | aa6 | bb6 | cc6 |

FIG.23

| MONITORING UNIT ID | MONITORING INFORMATION ITEM ID | MEASURED VALUE | MEASUREMENT TIME POINT |
|---|---|---|---|
| PC001 | sig0001 | 33.00 | 2016/09/01 12:00:00 |
| | sig0002 | **** | **** |
| | sig0003 | **** | **** |
| PC002 | sig0004 | 0.00 | 2010/01/01 12:00:00 |

MONITORING SYSTEM, DATA MODEL MANAGEMENT DEVICE, AND METHOD OF GENERATING DISPLAY DATA

FIELD

The present invention relates to a monitoring system that monitors status of an installation and status of a device. The present invention also relates to a data model management device and a method of generating display data.

BACKGROUND

An administrator of a conventional monitoring system specifies relationships among constituent elements of the system in advance and matches a monitoring information item collected from a sensor by checking operation status and connection status of each of the constituent elements. When the sensor or a monitoring unit that collects the monitoring information item from the sensor is replaced because of, for example, malfunction, the administrator needs to check a system configuration and the matching of the monitoring information item. Specifically, the administrator checks the system configuration by checking the relationships among the constituent elements for update. When checking the matching of the monitoring information item after the replacement of the monitoring unit, the administrator checks for continuity between a new monitoring information item that is collected after the replacement from a monitoring unit and the monitoring information item collected from the previous monitoring unit and makes a change such that the monitoring information items are stored while being associated with each other. Disclosed in Patent Literature 1 as a method of checking a system configuration is a technique that reduces workloads on an administrator by constructing a mechanism that finds constituent elements of a system and automatically updates relationships among the constituent elements.

CITATION LIST

Patent Literature

Patent Literature 1: Japanese Patent Application Laid-open No. 2008-9861

SUMMARY

Technical Problem

The above conventional technique, however, requires that a sensor or a monitoring unit be replaced by the same model or an alternate thereof. As such, in cases where that model is not available for replacement because of, for example, discontinued production, a different model is used, and there is a problem in that the update may not be able to be performed automatically. Moreover, the above conventional technique cannot achieve an automated matching check on a monitoring information item and thus this requires the administrator to make a matching check, which is problematic.

The present invention has been made in view of the above, and an object of the present invention is to obtain a monitoring system that is capable of automatically changing association of a collected monitoring information item when a constituent element is changed.

Solution to Problem

To solve the above problems and to achieve the object, a monitoring system according an aspect of the present invention includes a monitoring device to collect and retain a monitoring information item that is a result of monitoring by a monitor terminal. The monitoring system further includes a configuration information item management device to retain a configuration information item that is information about the monitor terminal connected to the monitoring system. The monitoring system further includes a data model management device to generate, by means of a data model, display data intended for display of the monitoring information item, the data model including information associating the monitoring information item with the configuration information item. The monitoring system further includes a display device to obtain the display data and to control the display of the monitoring information item.

Advantageous Effect of Invention

The present invention enables automatic change of association of the collected monitoring information item when a constituent element is changed.

BRIEF DESCRIPTION OF DRAWINGS

FIG. 2 is a diagram illustrating an example of a first table that is held by a monitoring information item storage unit according to the first embodiment.

FIG. 3 is a diagram illustrating an example of a second table that is held by a configuration information item storage unit according to the first embodiment.

FIG. 4 is a diagram illustrating an example of a third table that is held by a data model storage unit according to the first embodiment.

FIG. 23 is a diagram illustrating an example of a fourth table for a display data storage unit according to the fourth embodiment to retain the display data.

DESCRIPTION OF EMBODIMENTS

With reference to the drawings, a detailed description is hereinafter provided of monitoring systems, data model management devices, and methods of generating display data according to embodiments of the present invention. It is to be noted that these embodiments are not restrictive of the present invention.

First Embodiment

Figure 1:
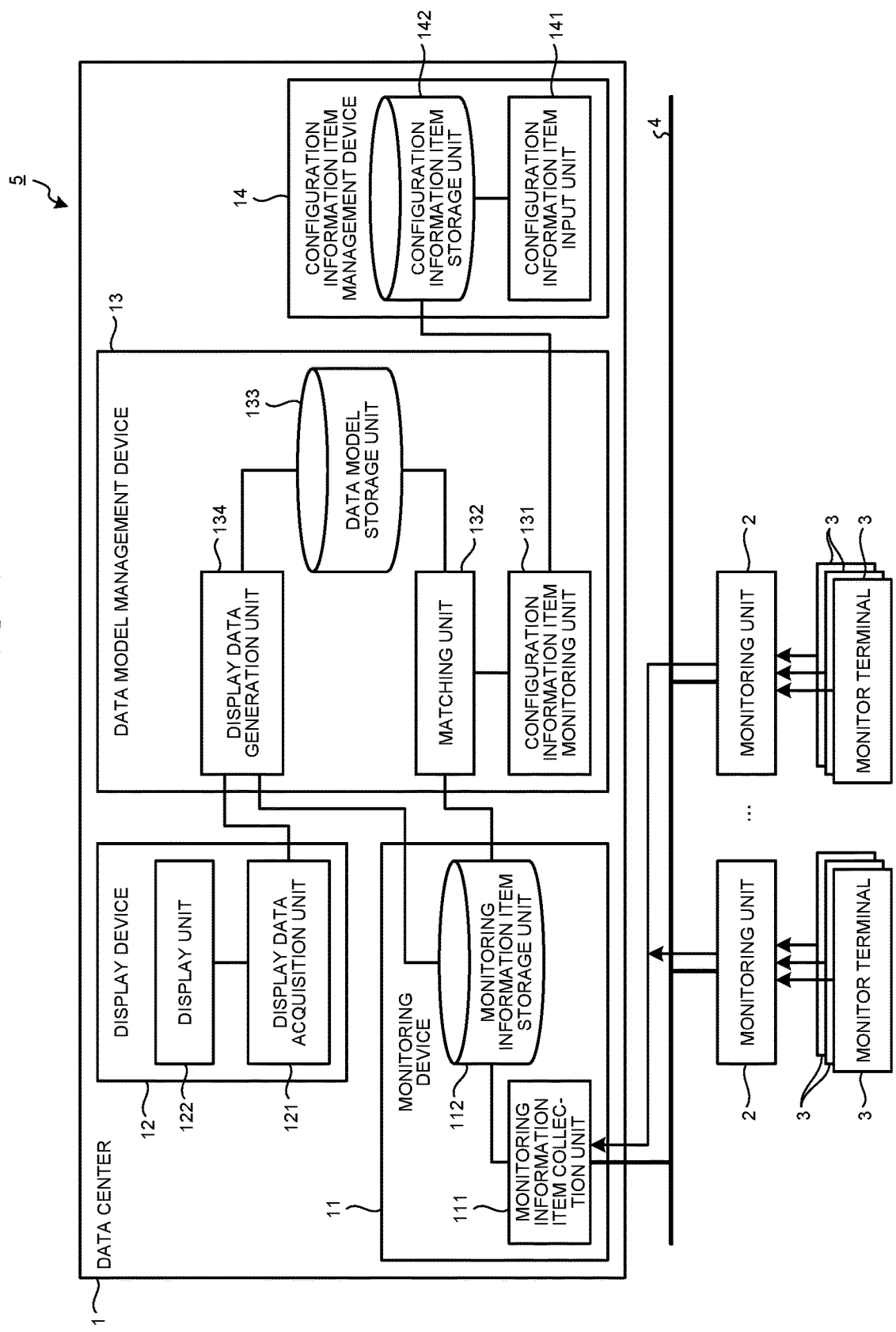
FIG. 1 is a diagram illustrating an example configuration of a monitoring system according to a first embodiment.

FIG. 1 is a diagram illustrating an example configuration of a monitoring system 5 according to a first embodiment of the present invention. The monitoring system 5 includes a data center 1, monitoring units 2, and monitor terminals 3. In the monitoring system 5, the data center 1 and the monitoring units 2 are connected over a network 4. The data center 1 is connectable to the plurality of monitoring units 2 over the network 4. Each of the monitoring units 2 is connectable to the multiple monitor terminals 3.

The monitor terminal 3 has a sensor function to measure, for example, temperature, voltage, or electric current of a monitoring target, or pressure or a water level in a monitoring target, and it transmits, to the monitoring unit 2, a monitoring information item that is a result of monitoring of the monitoring target. The monitoring unit 2 collects, from the monitor terminal 3, the monitoring information item, that is, the result of monitoring by the monitor terminal 3 and transmits this monitoring information item to the data center 1 over the network 4. The network 4 is a network over which a plurality of machines can communicate and is, for example, the Internet or an intranet.

A detailed description is provided of a configuration of the data center 1. The data center 1 includes a monitoring device 11, a display device 12, a data model management device 13, and a configuration information item management device 14.

The monitoring device 11 collects and retains the monitoring information items that are the results of monitoring by the monitor terminals 3. The monitoring device 11 includes a monitoring information item collection unit 111 and a monitoring information item storage unit 112. FIG. 2 is a diagram illustrating an example of a first table that is held by the monitoring information item storage unit 112 according to the first embodiment. The first table retains the monitoring information items from the monitor terminals 3. Items that are set in the first table include a monitoring information item ID identifying a monitoring item that is monitored or measured by the monitor terminal 3, the monitoring information item, i.e., the measured value, that is determined by the monitor terminal 3, and a measurement time point when the aforementioned monitoring information item, i.e., the measured value, is determined. The monitoring information item ID is identification information that enables finding of the monitor terminal 3 that monitors the monitoring item identified by the monitoring information item ID. The monitoring information item of each of the monitor terminals 3 is collected by the monitoring information item collection unit 111 from the monitoring unit 2 and includes the monitoring information item ID, the measured value, and the measurement time point that are illustrated in FIG. 2. The monitoring information item storage unit 112 is a storage unit that stores the monitoring information items.

Upon collecting the monitoring information item of each of the monitor terminals 3 from the monitoring unit 2 over the network 4, the monitoring information item collection unit 111 stores the collected monitoring information item in the monitoring information item storage unit 112. Specifically, the monitoring information item collection unit 111 writes, to the first table held by the monitoring information item storage unit 112, the monitoring information item ID, the measured value, and the measurement time point that are included in the monitoring information item. The monitoring information item storage unit 112 retains the monitoring information items from the monitor terminals 3 collected by the monitoring information item collection unit 111.

The display device 12 obtains display data and controls monitoring information item display. The display device 12 includes a display data acquisition unit 121 and a display unit 122. The display data acquisition unit 121 obtains, from the data model management device 13 that is described later, the display data on the monitoring information item(s) that is generated by the data model management device 13 and controls, based on the display data, the display of the monitoring information item(s) that takes place at the display unit 122. The display unit 122 is a display such as a liquid crystal display (LCD).

The configuration information item management device 14 retains configuration information items that are each information about the monitor terminal 3 connected to the monitoring system 5. The configuration information item management device 14 includes a configuration information item input unit 141 and a configuration information item storage unit 142. FIG. 3 is a diagram illustrating an example of a second table that is held by the configuration information item storage unit 142 according to the first embodiment. The second table retains the configuration information items each including information about operation status of the monitor terminal 3. Items that are set in the second table include a terminal ID identifying the monitor terminal 3, a status indicative of the operation status of the monitor terminal 3, and a latest check time point that is a last time point when the status indicative of the operation status of the monitor terminal 3 is checked. Upon receiving a user input regarding the operation status of the monitor terminal 3, the configuration information item input unit 141 generates the configuration information item for storage in the configuration information item storage unit 142. The configuration information item storage unit 142 is a storage unit that stores the configuration information items.

The data model management device 13 is a display data generation device that generates display data intended for monitoring information item display by means of a data model that includes information associating the monitoring information item with the configuration information item. The data model management device 13 includes a configuration information item monitoring unit 131, a matching unit 132, a data model storage unit 133, and a display data generation unit 134. FIG. 4 is a diagram illustrating an example of a third table that is held by the data model storage unit 133 according to the first embodiment. The third table retains those data models that each include information associating the monitoring information item with the configuration information item. Items that are set in the third table include a monitoring unit ID identifying the monitoring unit 2 that is given in a process (described later) to be carried out by the matching unit 132, the monitoring information item ID, the terminal ID, an operation start time point indicative of a time point when the monitor terminal 3 identified by the terminal ID starts operating, and an operation finish time point indicative of a time point when the operation of the monitor terminal 3 identified by the terminal ID finishes. The operation start time point and the operation finish time point for each of the terminal IDs represent a replacement history of the terminal, namely, the monitor terminal 3. The data model storage unit 133 is a storage unit that stores the data models. As illustrated in FIG. 4, the data model stored in the data model storage unit 133 includes the information associating the monitoring information item in FIG. 2 with the configuration information item in FIG. 3. The data model management device 13 automatically changes the data model stored in the data model storage unit 133, so that information indicative of a relation of connection between the monitoring unit 2 and the monitor terminal 3 in the monitoring system 5 is brought up to date to be retained.

Figure 5:
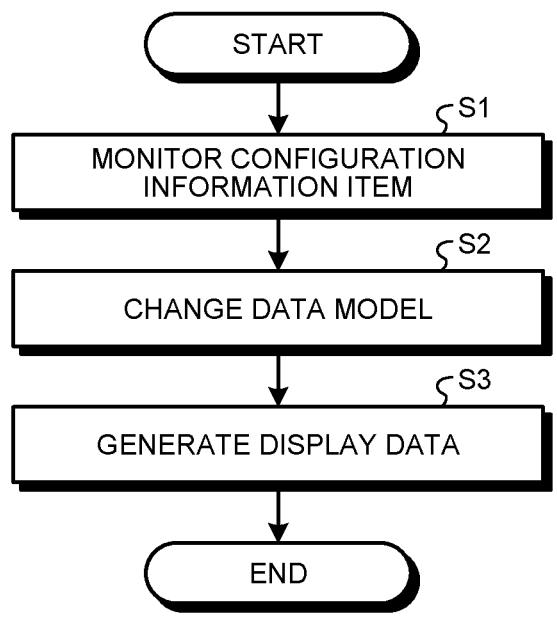
FIG. 5 is a flowchart illustrating a display data generation process in a data model management device according to the first embodiment.

A description is provided next of an operation that the data model management device 13 carries out to generate display data intended for monitoring information item display. FIG. 5 is a flowchart illustrating a display data generation process in the data model management device 13 according to the first embodiment. By referring to the configuration information item storage unit 142 of the configuration information item management device 14, the configuration information item monitoring unit 131 of the data model management device 13 first monitors the configuration information items that are retained by the configuration information item storage unit 142 and are each the information about the monitor terminal 3 connected to the monitoring system 5 (step S1).

Figure 6:
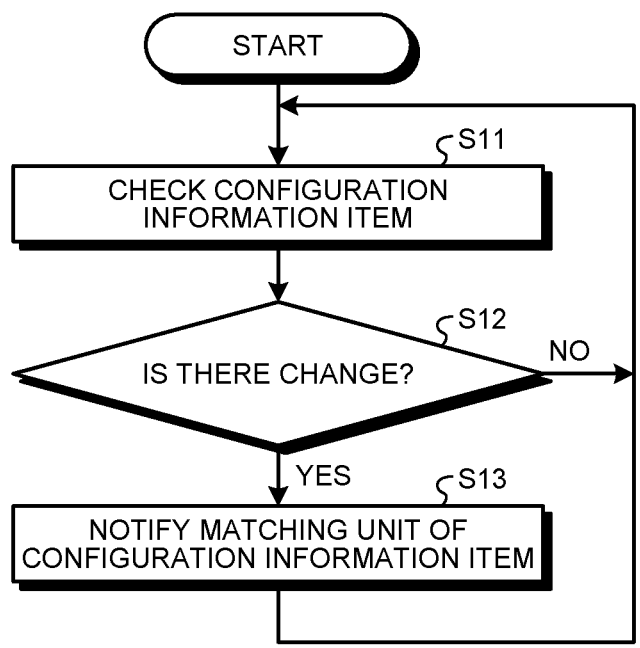
FIG. 6 is a flowchart illustrating a process that a configuration information item monitoring unit according to the first embodiment carries out to monitor the configuration information item storage unit.

FIG. 6 is a flowchart illustrating a process that the configuration information item monitoring unit 131 according to the first embodiment carries out to monitor the configuration information item storage unit 142. The configuration information item monitoring unit 131 checks each of the configuration information items of the configuration information item storage unit 142 in the configuration information item management device 14 (step S11) and sees if there is a change, namely, updated information (step S12). Presence of the change or the updated information corresponds to, for example, a case where the monitor terminal 3 that is identified by the terminal ID previously confirmed to be "in operation" has been changed to a "stop" status, while the monitor terminal 3 that is identified by the terminal ID that has not been present in the previous check is added and is "in operation". If there is no change (step S12: No), the configuration information item monitoring unit 131 returns to step S11 for continued checking of the configuration information items in the configuration information item storage unit 142.

If there is a change (step S12: Yes), the configuration information item monitoring unit 131 notifies the matching unit 132 of the configuration information item of the configuration information item storage unit 142 (step S13). The configuration information item monitoring unit 131 may notify the matching unit 132 of all the configuration information items retained by the configuration information item storage unit 142 or may notify the matching unit 132 of only the changed configuration information item among the configuration information items retained by the configuration information item storage unit 142. Subsequently to step S13, the configuration information item monitoring unit 131 returns to step S11 for continued checking of the configuration information items in the configuration information item storage unit 142. It is to be noted that the configuration information item monitoring unit 131 may carry out step S11 periodically or at specified times.

The description here refers back to the flowchart in FIG. 5. In cases where there is a change among the configuration information items of the configuration information item storage unit 142, upon receiving the notification about the change among the configuration information items from the configuration information item monitoring unit 131, the matching unit 132 changes the data model retained by the data model storage unit 133 (step S2).

Figure 7:
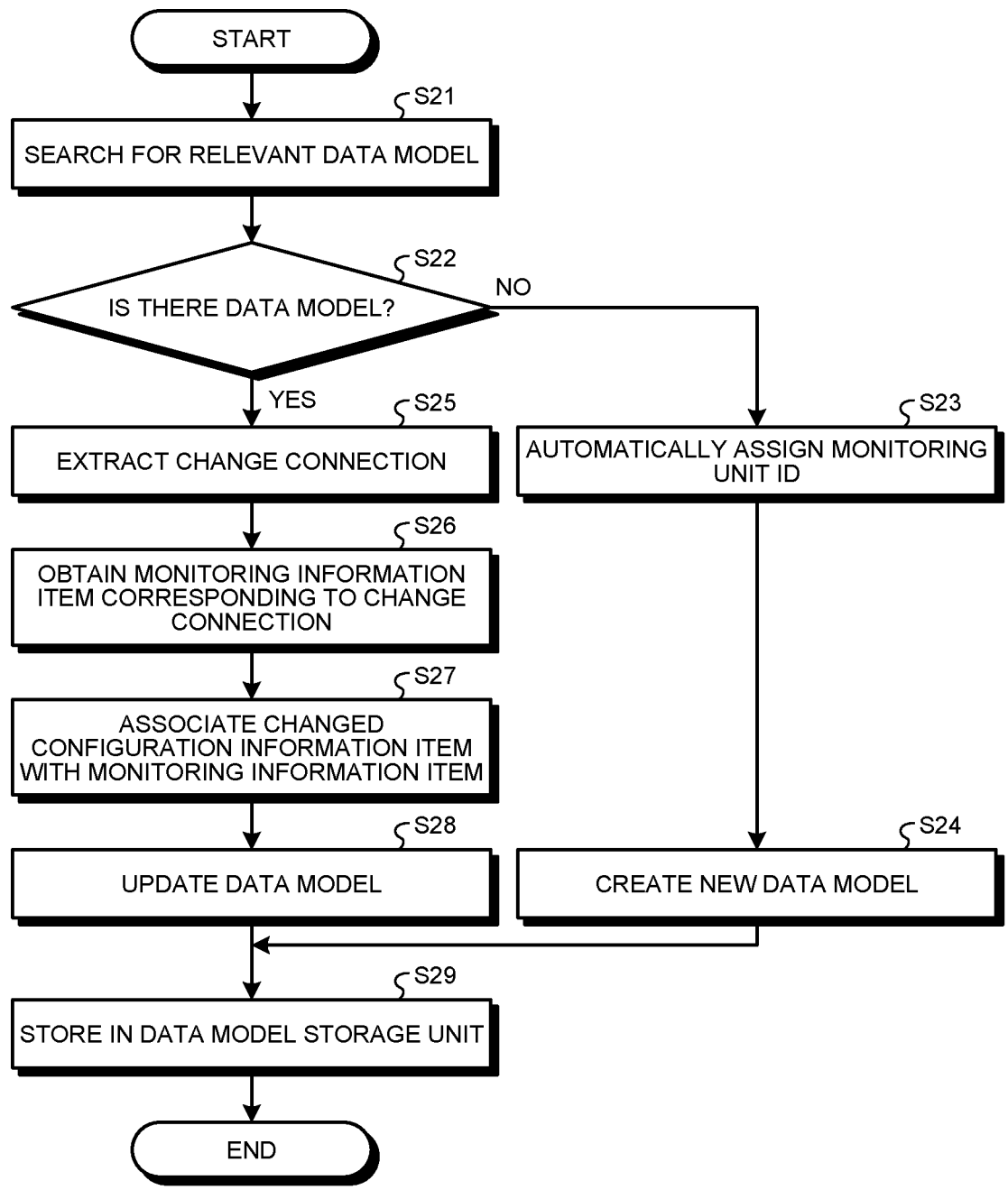
FIG. 7 is a flowchart illustrating a process that a matching unit according to the first embodiment carries out to change a data model.

FIG. 7 is a flowchart illustrating a process that the matching unit 132 according to the first embodiment carries out to change the data model. Upon receiving the notification about the change among the configuration information items from the configuration information item monitoring unit 131, the matching unit 132 searches the data model storage unit 133 for the data model relevant to the terminal ID included in the changed configuration information item (step S21). If there is no relevant data model in the data model storage unit 133 (step S22: No), the matching unit 132 automatically assigns a monitoring unit ID that is a key value of a data model (step S23) and creates a new data model (step S24). Corresponding to step S22: No is, for example, a case where a new monitoring unit 2 and a new monitor terminal 3 are added. The matching unit 132 stores the newly created data model in the data model storage unit 133 (step S29).

If the relevant data model exists in the data model storage unit 133 (step S22: Yes), the matching unit 132 extracts, from details of the change among the configuration information items, a change connection such as addition, removal, or replacement of the monitor terminal 3 (step S25). Corresponding to step S22: Yes is, for example, a case where the monitor terminal 3 is replaced. When notified of all the configuration information items by the configuration information item monitoring unit 131, the matching unit 132 may extract the change connection from difference between configuration information items from a previous notification and the configuration information items from the current notification. The matching unit 132 obtains, from the monitoring information item storage unit 112, the monitoring information item collected by the monitoring unit 2 corresponding to the change connection (step S26). The monitoring unit 2 corresponding to the change connection is the monitoring unit 2 that corresponds, in the data model in the FIG. 4, to the terminal ID of any of the monitor terminals 3 that has to do with the change connection such as the addition, the removal, or the replacement.

The matching unit 132 associates the changed configuration information item with the monitoring information item, thus creating a data model reflective of the change among the configuration information items (step S27) and updates the data model not reflecting the change among the configuration information items to the data model reflective of the change among the configuration information items (step S28). Since the monitoring information item ID is the identification information that enables finding of the monitor terminal 3 that monitors, the matching unit 132 can associate the changed configuration information item with the monitoring information item by using the monitoring information item ID included in the monitoring information item in FIG. 2 and the terminal ID included in the configuration information item in FIG. 3. The matching unit 132 stores the up-to-date data model in the data model storage unit 133 (step S29).

The data model illustrated in FIG. 4 shows that the monitor terminal 3 identified by the terminal ID "eqp001" that has been connected to the monitoring unit 2 that is identified by the monitoring unit ID "PC001" to monitor the monitoring items identified by the monitoring information item IDs including "sig0001", "sig0002", and "sig0003" has had its operation stopped and has been replaced by the added monitor terminals 3 that are in operation and are identified by the terminal IDs "eqp002" and "eqp003". This data model also shows that the monitor terminal 3 identified by the terminal ID "eqp002" monitors, in place of the monitor terminal 3 identified by the terminal ID "eqp001", the monitoring items identified by the monitoring information item IDs "sig0001" and "sig0002", while the monitor terminal 3 identified by the terminal ID "eqp003" monitors, in place of the monitor terminal 3 identified by the terminal ID "eqp001", the monitoring item identified by the monitoring information item ID "sig0003".

The description here refers back to the flowchart in FIG. 5. When notified by the display device 12 that the monitoring information item is to be displayed, the display data generation unit 134 generates the display data intended for the monitoring information item display on the basis of the data model and outputs the generated display data to the display device 12 (step S3).

Figure 8:
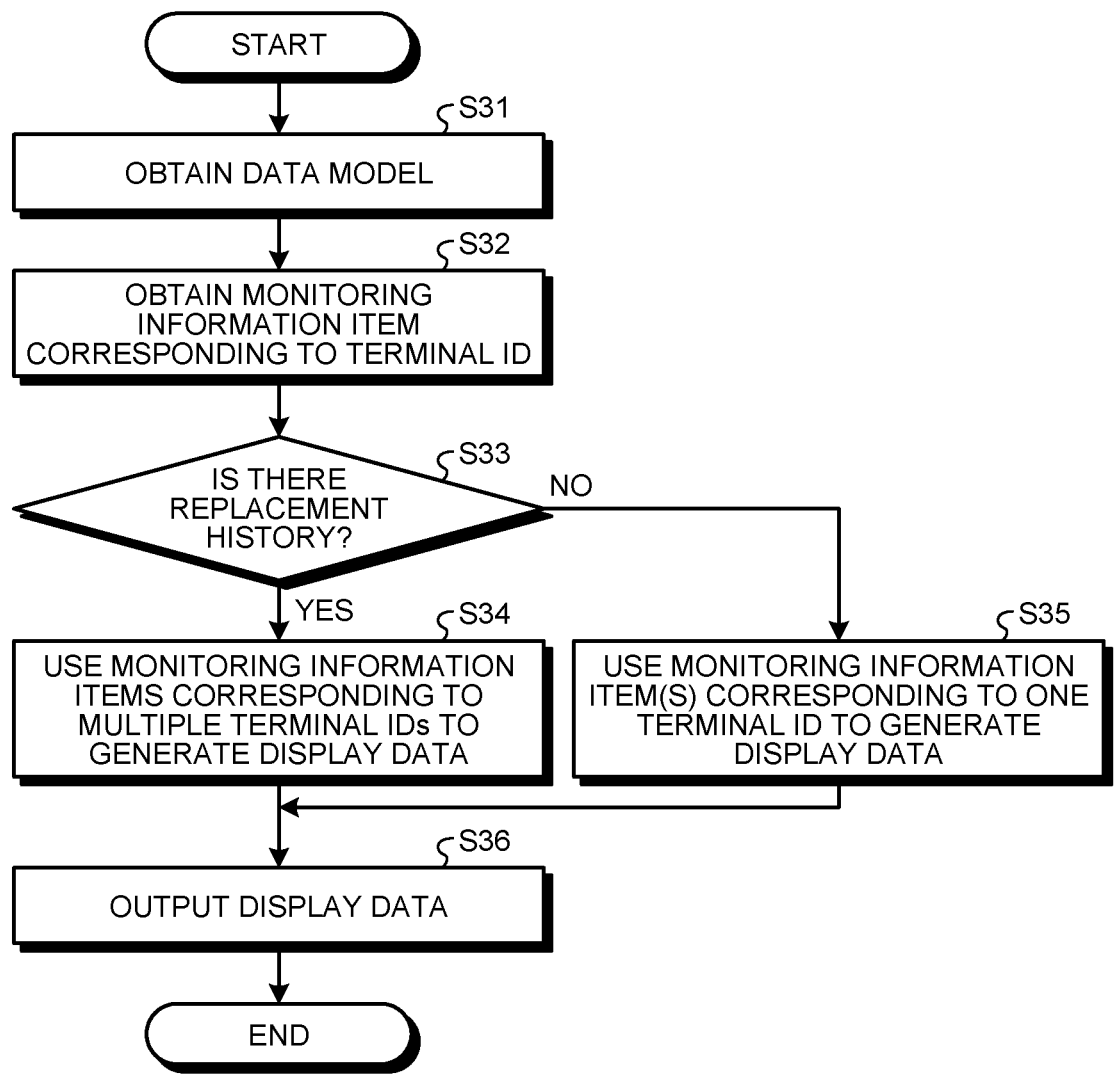
FIG. 8 is a flowchart illustrating a process that a display data generation unit according to the first embodiment carries out to generate display data intended for monitoring information item display on the basis of a configuration agreeing with the data model.

FIG. 8 is a flowchart illustrating a process that the display data generation unit 134 according to the first embodiment carries out to generate the display data intended for the monitoring information item display on the basis of a configuration agreeing with the data model. When notified by the display data acquisition unit 121 of the display device 12 that the monitoring information item is to be displayed, the display data generation unit 134 obtains from the data model storage unit 133 the data model relevant to the monitoring information item to be displayed (step S31). With regard to the monitoring information item of the monitor terminal 3 included in the notification from the display data acquisition unit 121, the display data generation unit 134 obtains, from the monitoring information item storage unit 112, the monitoring information item corresponding to the terminal ID (step S32). Specifically, the display data generation unit 134 obtains, from the monitoring information item storage unit 112, the measured value and the measurement time point regarding the monitoring information item ID corresponding to the terminal ID.

If the obtained data model shows that the monitor terminal 3 has a replacement history (step S33: Yes), the display data generation unit 134 uses, with respect to the specified monitoring information item ID, the monitoring information items corresponding to the multiple terminal IDs to generate the display data (step S34), since these monitoring information items corresponding to the multiple terminal IDs are already obtained from the monitoring information item storage unit 112 in step S32. Corresponding to step S33: Yes is a case where, as shown in the data model in FIG. 4, the monitor terminal 3 identified by the terminal ID "eqp001" has been replaced by the monitor terminals 3 identified by the terminal IDs "eqp002" and "eqp003". If, for example, the monitor terminal 3 that has monitored the monitoring item identified by the specified monitoring information item ID has been replaced by reason of, for example, malfunction, the display data generation unit 134 uses the measured values obtained by the monitor terminals 3 before and after the replacement when generating display data on a chronological series of the monitoring information items. The display data generation unit 134 outputs the generated display data to the display data acquisition unit 121 (step S36).

If the obtained data model shows that the monitor terminal 3 has no replacement history (step S33: No), the display data generation unit 134 uses, with respect to the specified monitoring information item ID, the monitoring information item(s) corresponding to the one terminal ID to generate the display data (step S35), since the monitoring information item or the monitoring information items that correspond to the one terminal ID are already obtained from the monitoring information item storage unit 112 in step S32. Corresponding to step S33: No is a case where, as shown in the data model in FIG. 4, the monitor terminal 3 identified by the terminal ID "eqp004" is yet to be replaced. The display data generation unit 134 outputs the generated display data to the display data acquisition unit 121 (step S36).

In step S34 or S35, the generation of the display data with respect to the one monitoring information item ID is described as an example. It is to be noted, however, that the display data generation unit 134 can also generate display data with respect to the multiple monitoring information item IDs. In that case, the display data generation unit 134 carries out the process illustrated by the flowchart in FIG. 8 for each of the monitoring information item IDs specified in the notification from the display data acquisition unit 121, and the processes for the respective monitoring information item IDs may be carried out concurrently.

In the display device 12, upon obtaining the display data from the display data generation unit 134, the display data acquisition unit 121 controls display of the monitoring information item(s) shown in the display data on the display unit 122.

Figure 9:
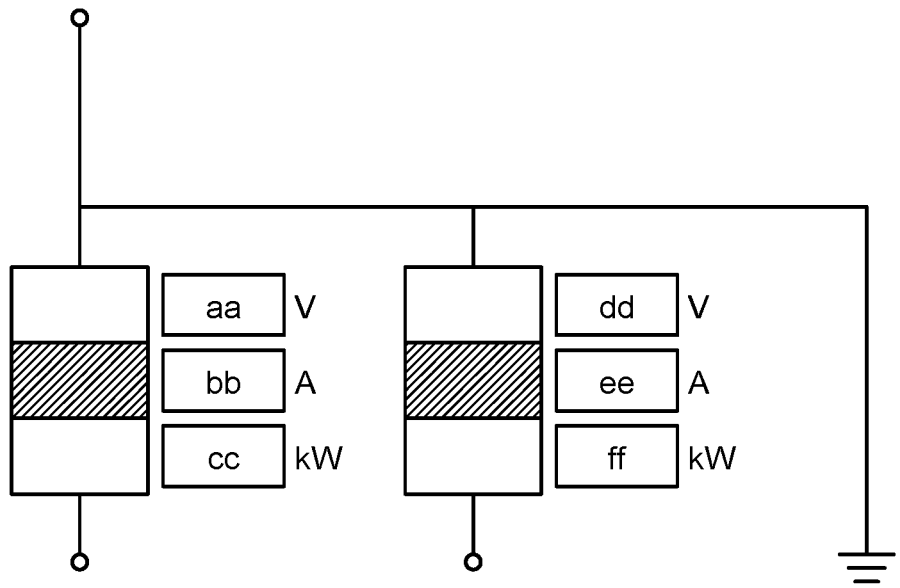
FIG. 9 is a diagram illustrating a display screen as a first example that is displayed, at a display device according to the first embodiment, for those monitoring information items about a power system.

A description is provided here of monitoring-information-item display details that are shown in the display data generated by the display data generation unit 134. FIG. 9 is a diagram illustrating a display screen as a first example that is displayed, at the display device 12 according to the first embodiment, for those monitoring information items about a power system. The display data generation unit 134 uses the up-to-date monitoring information items to generate the display data that shows the multiple monitoring information items, namely, a voltage, an electric current and electric energy of each of power lines in the example in FIG. 9. By using the display data generated by the display data generation unit 134, the display device 12 provides display on the display screen in FIG. 9.

Figure 10:
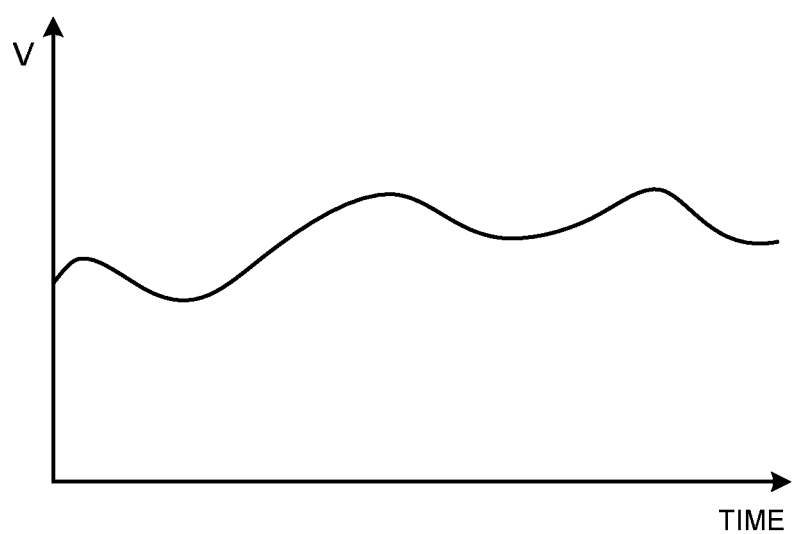
FIG. 10 is a diagram illustrating a display screen as a second example that is displayed, at the display device according to the first embodiment, for those monitoring information items about the power system.

FIG. 10 is a diagram illustrating a display screen as a second example that is displayed, at the display device 12 according to the first embodiment, for those monitoring information items about the power system. The display data generation unit 134 uses the past monitoring information items on voltage across the specified power line to generate the graphical display data that shows changes in the voltage over time. By using the display data generated by the display data generation unit 134, the display device 12 provides display on the display screen in FIG. 10.

Figures 11, 12:
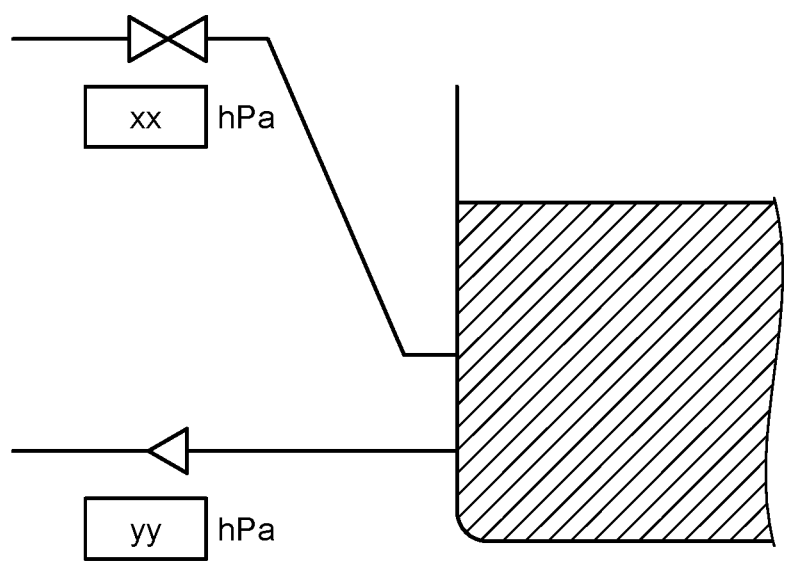
FIG. 11 is a diagram illustrating a display screen as a third example that is displayed, at the display device according to the first embodiment, for those monitoring information items about the power system.
FIG. 12 is a diagram illustrating a display screen as an example that is displayed, at the display device according to the first embodiment, for those monitoring information items about pipes of a water treatment system.

FIG. 11 is a diagram illustrating a display screen as a third example that is displayed, at the display device 12 according to the first embodiment, for those monitoring information items about the power system. The display data generation unit 134 uses the past monitoring information items on voltage across, electric current through, and electric energy of the specified power line to generate the tabular display data that shows changes in the voltage, electric current, and electric energy over time. By using the display data generated by the display data generation unit 134, the display device 12 provides display on the display screen in FIG. 11.

When there is replacement of the monitor terminals 3 that monitor the monitoring information items, the display data generation unit 134 can determine a replacement time by checking the data model of the data model storage unit 133. Accordingly, the display data generation unit 134 may generate the display data such that, as illustrated in FIG. 11, the background color for those measured values obtained after the replacement of the monitor terminals 3, namely, at and after a time point t4 in this case, is changed.

In cases where the monitor terminal 3 is replaced by the monitor terminal 3 with improved functionality, improved measurement accuracy, measurement in a shorter cycle, and others are conceivably achieved by the monitor terminal 3 after the replacement. In such cases, in display of changes over time as in FIG. 10 or 11, displaying in the same way before and after the replacement can render the measured value changes easy to compare. Accordingly, when there is such replacement of the monitor terminal 3, the display data generation unit 134 may generate display data such that even after the replacement, monitoring information items of the monitor terminal 3 are displayed with measurement accuracy and the time interval being unchanged.

It is to be noted that the monitoring targets of the monitoring system 5 are not limited to the power system and can also apply to another installation. FIG. 12 is a diagram illustrating a display screen as an example that is displayed, at the display device 12 according to the first embodiment, for those monitoring information items about pipes of a water treatment system. As in the case of FIG. 9, the display data generation unit 134 uses the up-to-date monitoring information items to generate the display data that shows the multiple monitoring information items, namely, a water pressure in each of the pipes in the example in FIG. 12. By using the display data generated by the display data generation unit 134, the display device 12 provides display on the display screen in FIG. 12. As in the case of FIG. 10 or 11, the display data generation unit 134 can also generate display data that shows measured value changes (not illustrated) over time.

A description is provided next of a hardware configuration for the data model management device 13 in the data center 1. The data model storage unit 133 of the data model management device 13 is implemented by use of a memory. The configuration information item monitoring unit 131, the matching unit 132, and the display data generation unit 134 are implemented by use of an interface circuit and a processing circuit. In other words, the data model management device 13 includes the processing circuit that monitors the configuration information items of the configuration information item management device 14, changes the data model, and generates the display data intended for the monitoring information item display. The processing circuit may be dedicated hardware or may include a memory and a central processing unit (CPU) that executes programs stored in the memory.

Figure 13:
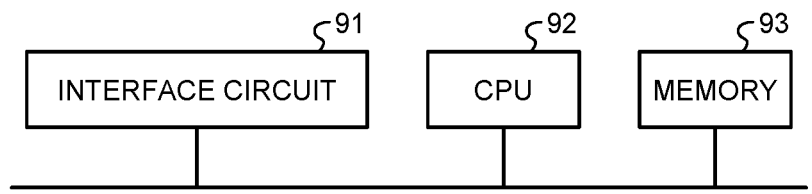
FIG. 13 is a diagram illustrating an example in which a processing circuit of the data model management device according to the first embodiment is formed of a central processing unit (CPU) and a memory.

FIG. 13 is a diagram illustrating an example in which the processing circuit of the data model management device 13 according to the first embodiment is formed of a CPU and a memory. The interface circuit mentioned earlier corresponds to an interface circuit 91 in FIG. 13. The memory mentioned earlier can be a memory 93 of FIG. 13 but may be a memory separate from the memory 93 used for implementation of the processing circuit. In cases where the processing circuit is formed of a CPU 92 and the memory 93, the functions of the configuration information item monitoring unit 131, the matching unit 132, and the display data generation unit 134 are each implemented by software, firmware, or a combination of software and firmware. The software or the firmware is described as the program and is stored in the memory 93. In the processing circuit, the CPU 92 reads and executes the programs stored in the memory 93 to implement the functions of the units. In other words, when implemented by the processing circuit, the data model management device 13 includes the memory 93 that stores the programs according to which the step for monitoring of the configuration information items of the configuration information item management device 14, the step for changing of the data model, and the step for display data generation are eventually carried out. These programs can be the ones that cause a computer to carry out the respective processes and respective methods of the configuration information item monitoring unit 131, the matching unit 132, and the display data generation unit 134. The CPU 92 here may be, for example, a processing unit, an arithmetic unit, a microprocessor, a microcomputer, a processor, or a digital signal processor (DSP). The memory 93 here corresponds to, for example, a nonvolatile or volatile semiconductor memory such as a random-access memory (RAM), a read-only memory (ROM), a flash memory, an erasable programmable ROM (EPROM), or an electrically EPROM (EEPROM) (registered trademark), a magnetic disk, a flexible disk, an optical disk, a compact disk, a mini disk, or a digital versatile disc (DVD).

Figure 14:
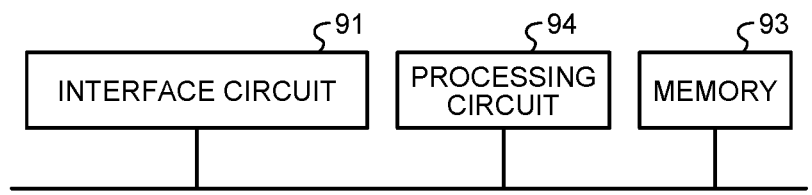
FIG. 14 is a diagram illustrating an example in which the processing circuit of the data model management device according to the first embodiment is formed of dedicated hardware.

FIG. 14 is a diagram illustrating an example in which the processing circuit of the data model management device 13 according to the first embodiment is formed of the dedicated hardware. In cases where the processing circuit is the dedicated hardware, a processing circuit 94 illustrated in FIG. 14 corresponds to, for example, a single circuit, a composite circuit, a programmed processor, a parallel programmed processor, an application specific integrated circuit (ASIC), a field-programmable gate array (FPGA), or a combination of these. The processing circuit 94 may implement the functions of the configuration information item monitoring unit 131, the matching unit 132, and the display data generation unit 134 individually or collectively.

It is to be noted that some of the functions of the configuration information item monitoring unit 131, the matching unit 132, and the display data generation unit 134 may be implemented by dedicated hardware, while some of the other functions may be implemented by software or firmware. By including the dedicated hardware, the software, the firmware, or the combination of these, the processing circuit can implement the above functions.

Even the monitoring device 11 and the configuration information item management device 14 of the data center 1 are each implemented by a hardware configuration similar to that of the data model management device 13. To implement the display device 12, the display is added to the example in FIG. 13 for implementation of the display unit 122, and the display is added to the example in FIG. 14 from which the memory 93 is removed.

According to the present embodiment described above, the data model management device 13 of the data center 1 monitors the configuration information items of the configuration information item management device 14. When there is a change among the configuration information items, the data model management device 13 automatically changes the data model that includes the information associating the configuration information item with the monitoring information item that is the monitoring result from the monitor terminal 3. As such, the data model management device 13 can seamlessly search for and browse the past monitoring information items without depending on the configuration information items and thus enables a reduced work load for a user such as an administrator and improved ease of monitoring information item browsing for a user such as an operator who operates the monitoring system 5.

In cases where, for example, a plurality of different models are used to implement the same functions as those of the monitor terminal 3 to be replaced as in the data model example in FIG. 4 for the reason that a replacement of the same model as the monitor terminal 3 to be replaced is discontinued, the data model management device 13 can automatically associate the monitoring information item of the monitor terminal 3 to be replaced with a monitoring information item of the replacement without involving the user in that operation. In cases where electricity demand forecasting is carried out on the basis of electric power information collected from a power reception and distribution monitoring control system, the data model management device 13 enables the user, such as the operator who operates the monitoring system 5, to browse a history of the monitoring information items without requiring the user to reconstruct the monitoring information items from a replacement record of the past monitor terminals 3 and the past monitoring units 2.

Second Embodiment

In the first embodiment, the user enters the configuration information item into the configuration information item input unit 141. In a second embodiment, a data center automatically generates a configuration information item through automatic collection.

Figure 15:
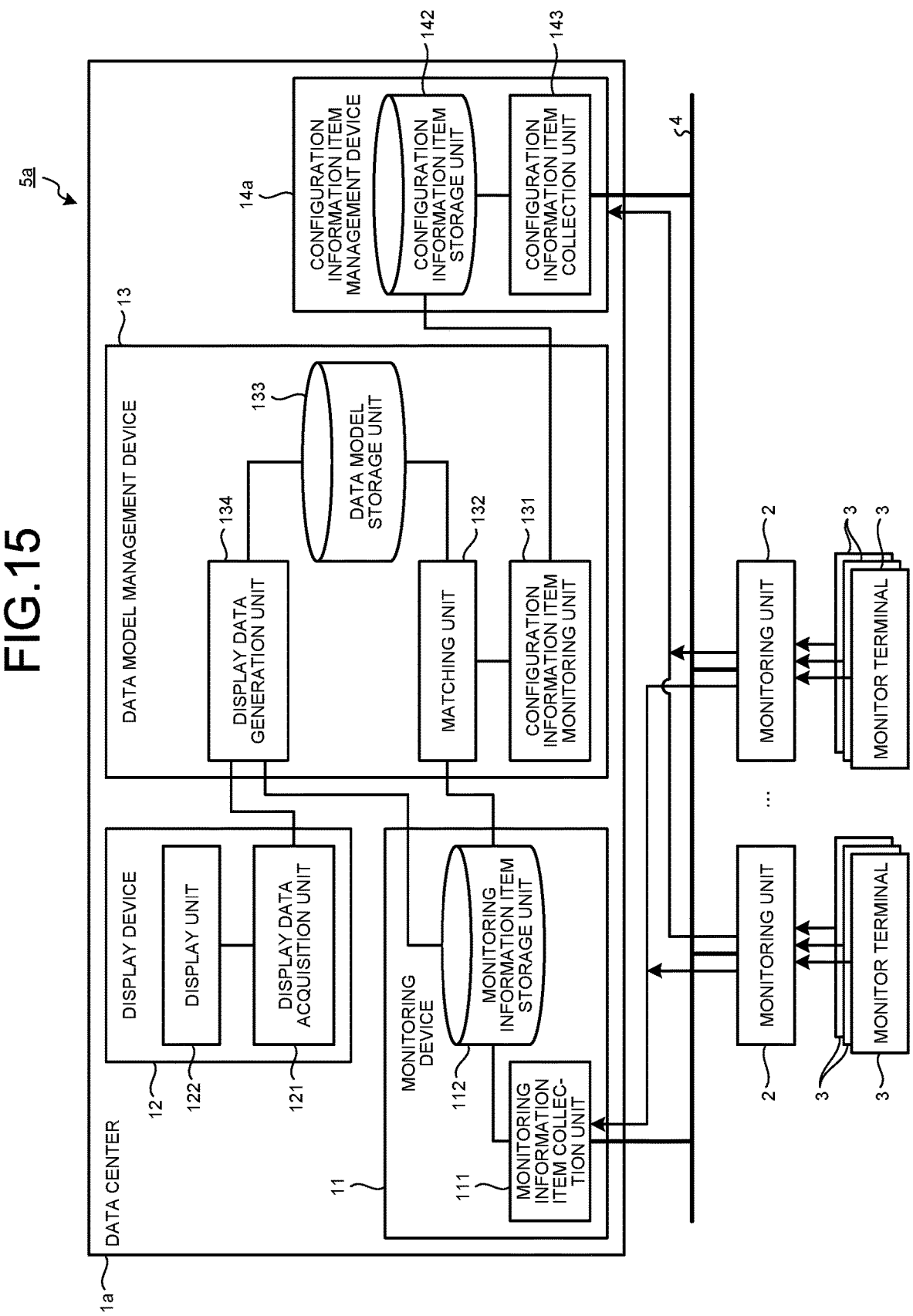
FIG. 15 is a diagram illustrating an example configuration of a monitoring system according to a second embodiment.

FIG. 15 is a diagram illustrating an example configuration of a monitoring system 5a according to the second embodiment. The monitoring system 5a includes a data center 1a in place of the data center 1 of the monitoring system 5. The data center 1a includes a configuration information item management device 14a in place of the configuration information item management device 14 of the data center 1.

The configuration information item management device 14a includes a configuration information item collection unit 143 and the configuration information item storage unit 142. The configuration information item collection unit 143 collects, over the network 4, information about operation status of the monitor terminal 3 connected to the monitoring system 5a from the monitoring unit 2 connected to the monitor terminal 3 to generate the configuration information item for storage in the configuration information item storage unit 142 or to update a configuration information item stored in the configuration information item storage unit 142. The configuration information items stored in the configuration information item storage unit 142 are similar to those of the first embodiment.

Figure 16:
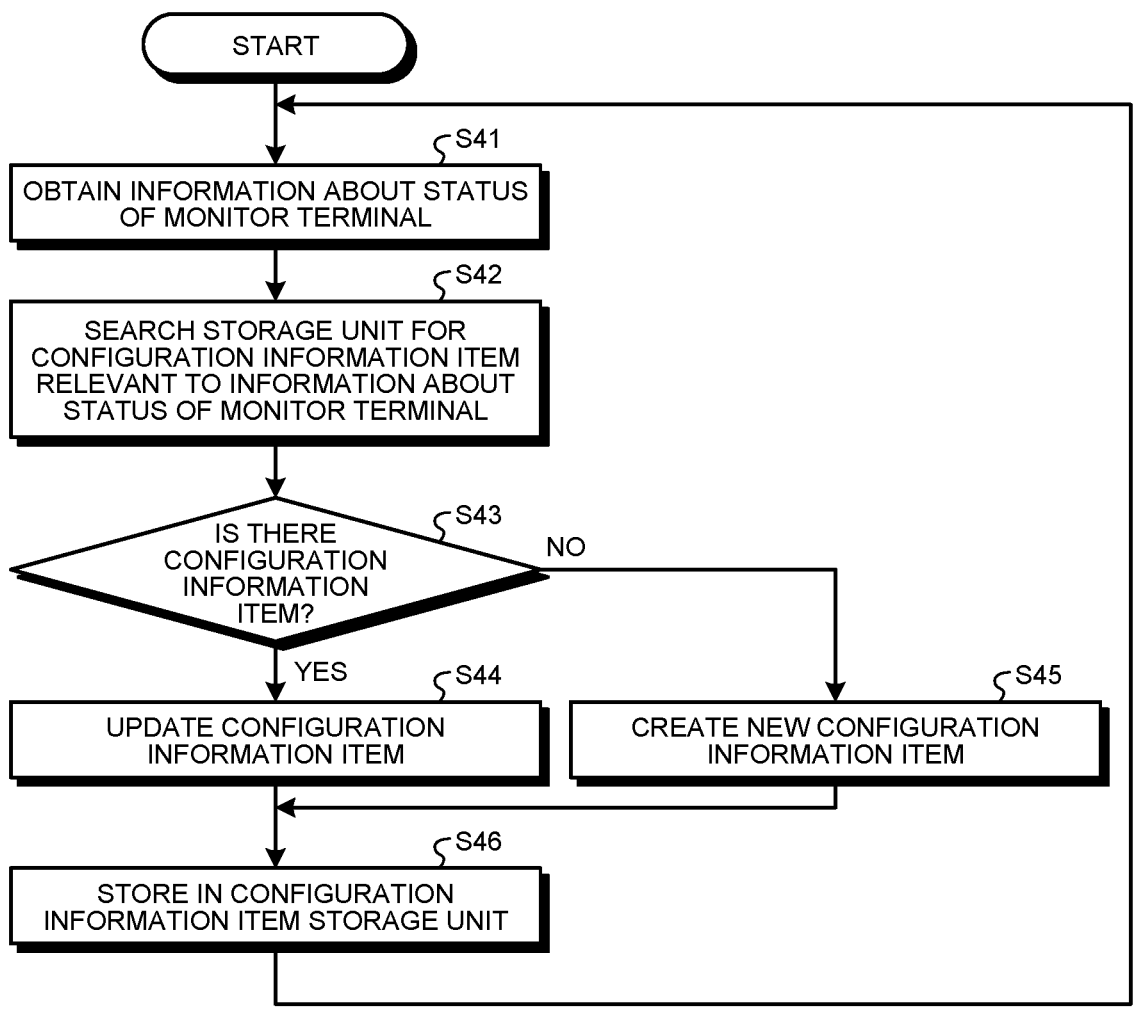
FIG. 16 is a flowchart illustrating a process that a configuration information item collection unit according to the second embodiment carries out to generate a configuration information item for storage in a configuration information item storage unit.

FIG. 16 is a flowchart illustrating a process that the configuration information item collection unit 143 according to the second embodiment carries out to generate the configuration information item for storage in the configuration information item storage unit 142. The configuration information item collection unit 143 obtains, over the network 4, the information about status, namely, the operation status of the monitor terminal 3 from the monitoring unit 2 being connected (step S41). The configuration information item collection unit 143 may obtain the information about the operation status of the monitor terminal 3 from, for example, details of a monitoring information item flowing from the monitoring unit 2 toward the monitoring information item collection unit 111 over the network 4. Another alternative is that in cases where the monitor terminal 3 regularly transmits a signal indicating that the operating monitor terminal 3 is in operation, the configuration information item collection unit 143 may obtain the information about the operation status of the monitor terminal 3 on the basis of this signal. The configuration information item collection unit 143 searches the configuration information item storage unit 142 for the configuration information item relevant to the obtained information about the status of the monitor terminal 3 (step S42).

If there exists the configuration information item corresponding to the obtained monitor terminal 3 in the configuration information item storage unit 142 (step S43: Yes), the configuration information item collection unit 143 updates a status and a latest check time point that are included in the configuration information item on the basis of the obtained operation status of the monitor terminal 3 (step S44). It is to be noted that the configuration information item collection unit 143 does not need to update the status when the status is the same as last time.

If the configuration information item corresponding to the obtained monitor terminal 3 does not exist in the configuration information item storage unit 142 (step S43: No), the configuration information item collection unit 143 creates the new configuration information item about the obtained monitor terminal 3 (step S45). Specifically, the configuration information item collection unit 143 generates the configuration information item including a terminal ID identifying the new monitor terminal 3, the status of the monitor terminal 3 identified by that terminal ID, and a latest check time point that is a time point when a check is made.

The configuration information item collection unit 143 stores the up-to-date or newly created configuration information item in the configuration information item storage unit 142 (step S46). When updating, the configuration information item collection unit 143 updates the information regarding the relevant terminal ID that is included in the configuration information item illustrated in FIG. 3. When storing the new configuration information item, the configuration information item collection unit 143 adds the information about the relevant terminal ID below the configuration information items illustrated in FIG. 3. Subsequently to step S46, the configuration information item collection unit 143 returns to step S41 to repeat the above process. It is to be noted that the configuration information item collection unit 143 may carry out step S41 periodically or at specified times.

In the data center 1a, operation of each of the data model management device 13, the monitoring device 11, and the display device 12 is similar to the one in the first embodiment.

As in the case of the first embodiment, the configuration illustrated in FIG. 13 or 14 is used as a hardware configuration for the configuration information item management device 14a.

According to the present embodiment described above, the configuration information item management device 14a of the data center 1a automatically collects the operation status of the monitor terminal 3 and automatically updates the configuration information item of the configuration information item storage unit 142. As such, the configuration information item management device 14a can keep the configuration information item of the configuration information item storage unit 142 up-to-date without depending on user operation.

Third Embodiment

In the first or second embodiment, the matching unit 132 automatically updates details of the data model stored in the data model storage unit 133. In a third embodiment, a user is allowed to edit the details of the data model. Although applicable to both the first and second embodiments, a description will be given on the basis of the configuration in the first embodiment as an example.

Figure 17:
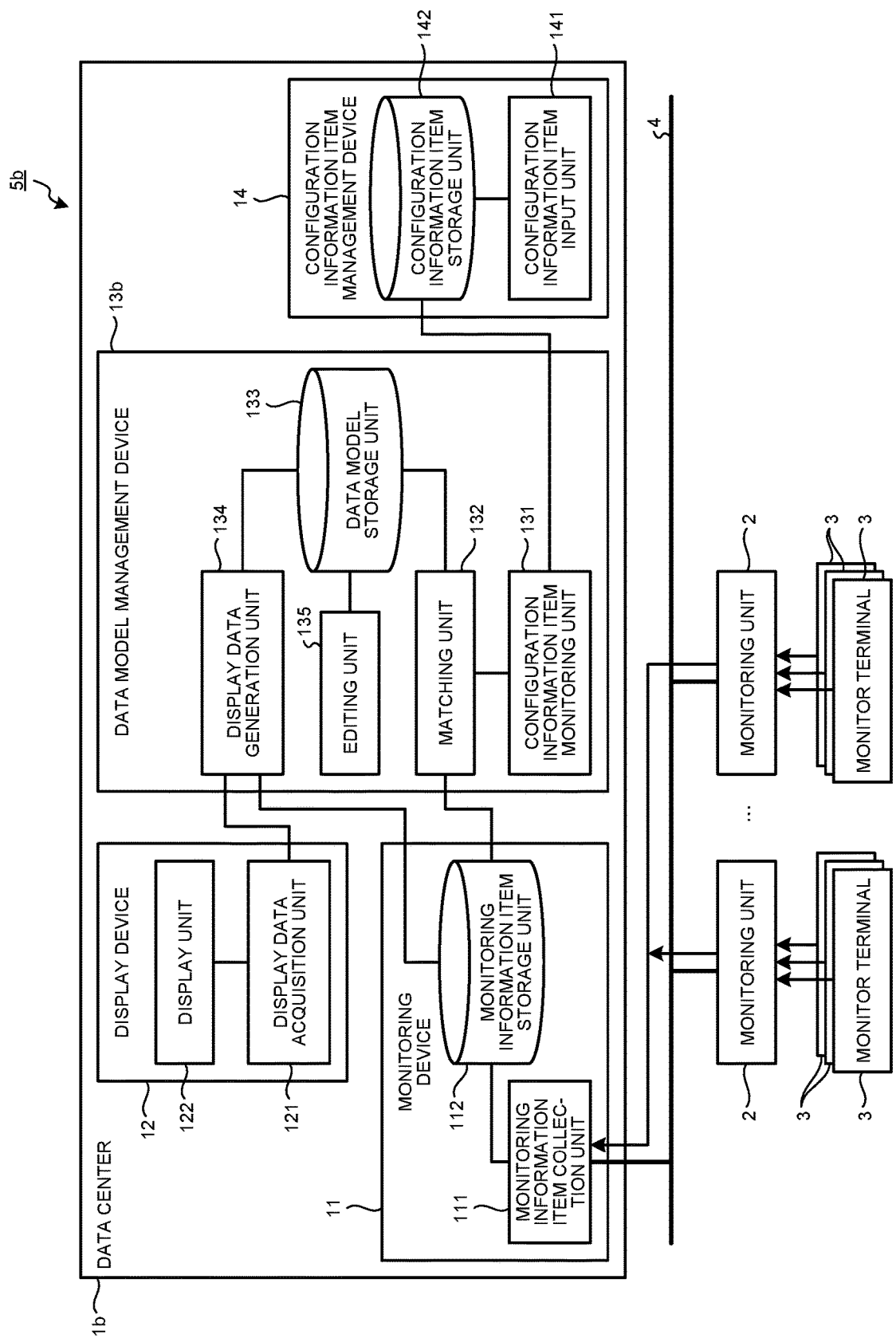
FIG. 17 is a diagram illustrating an example configuration of a monitoring system according to a third embodiment.

FIG. 17 is a diagram illustrating an example configuration of a monitoring system 5b according to the third embodiment. The monitoring system 5b includes a data center 1b in place of the data center 1 of the monitoring system 5 in the first embodiment illustrated in FIG. 1. The data center 1b includes a data model management device 13b in place of the data model management device 13 of the data center 1.

When compared with the data model management device 13, the data model management device 13b includes an editing unit 135 as an addition. Upon receiving a user input, the editing unit 135 edits or changes the details of the data model stored in the data model storage unit 133 according to the entered editing details. By using the editing unit 135, the user edits the details of the data model when, for example, the details of the data model are not up-to-date or include an error.

Figure 18:
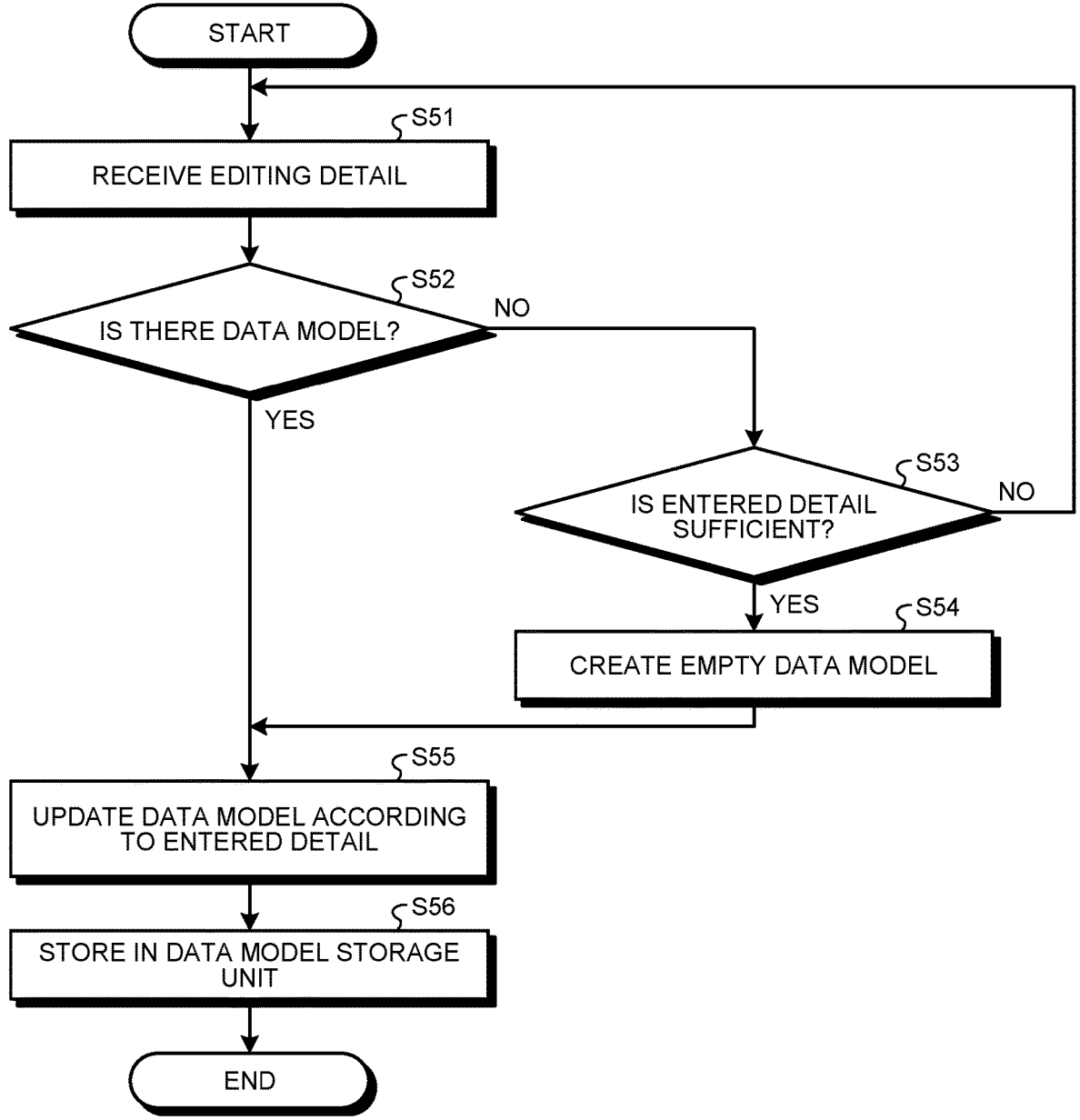
FIG. 18 is a flowchart illustrating a process that an editing unit according to the third embodiment carries out to edit a data model in response to user operation.

FIG. 18 is a flowchart illustrating a process that the editing unit 135 according to the third embodiment carries out to edit the data model in response to the user operation. The editing unit 135 receives the editing details that the user enters for the data model (step S51). If there exists the data model to be edited in the data model storage unit 133 (step S52: Yes), the editing unit 135 updates the data model according to the entered editing details (step S55). The editing unit 135 stores the up-to-date data model in the data model storage unit 133 (step S56).

If there is no data model to be edited in the data model storage unit 133 (step S52: No), the editing unit 135 checks whether the entered editing details are a sufficient amount of information for addition of a new data model (step S53). If the entered editing details are not sufficient (step S53: No), the editing unit 135 returns to step S51 to continue reception of editing details. If the entered editing details are sufficient (step S53: Yes), the editing unit 135 creates an empty data model (step S54) and writes to the empty data model according to the entered editing details, i.e., updates the data model according to the entered editing details (step S55). The editing unit 135 stores the updated data model in the data model storage unit 133 (step S56).

In the data center 1b, operation of each of the monitoring device 11, the display device 12, and the configuration information item management device 14 is similar to the one in the first embodiment.

A hardware configuration for the data model management device 13b includes, in addition to the configuration in FIG. 13 or the configuration in FIG. 14, an input unit that receives the editing details from the user, such as a mouse or a keyboard.

According to the present embodiment described above, the data model management device 13b of the data center 1b can add or change the data model as needed upon receiving the user input. As such, except for cases where there is configuration change among, for example, the monitor terminals 3 in the monitoring system 5b, the user can cause the data model management device 13b to change a given meaning among the machines.

Fourth Embodiment

In each of the first through third embodiments, the display data generation unit 134 generates the display data upon receiving the notification from the display data acquisition unit 121 of the display device 12. In a fourth embodiment, a display data generation unit that is described generates display data regardless of a notification from the display data acquisition unit 121. Although applicable to any of the first through third embodiments, a description will be given on the basis of the configuration in the first embodiment as an example.

Figure 19:
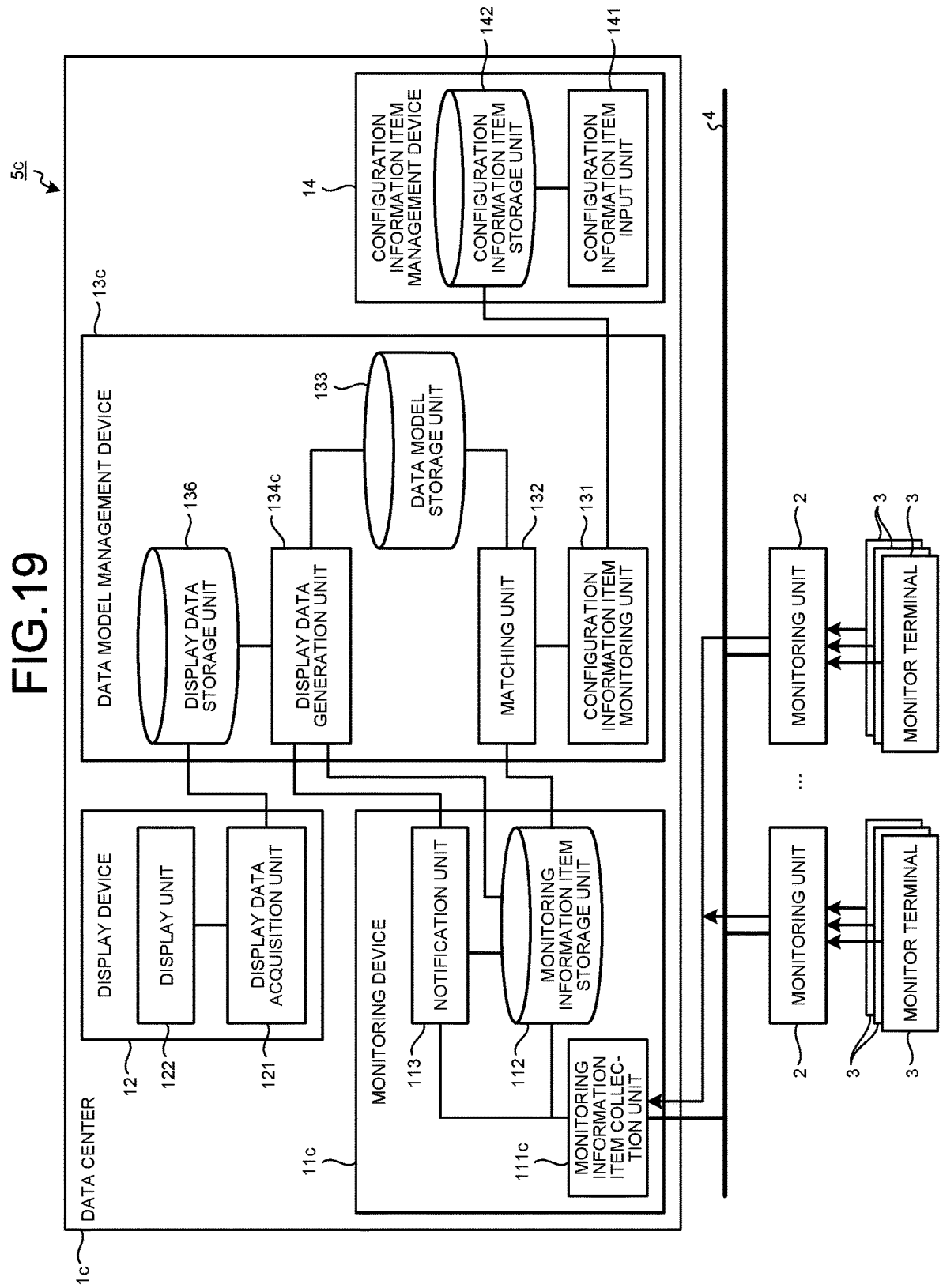
FIG. 19 is a diagram illustrating an example configuration of a monitoring system according to a fourth embodiment.

FIG. 19 is a diagram illustrating an example configuration of a monitoring system 5c according to the fourth embodiment. The monitoring system 5c includes a data center 1c in place of the data center 1 of the monitoring system 5 in the first embodiment illustrated in FIG. 1. The data center 1c includes a monitoring device 11c in place of the monitoring device 11 of the data center 1 and includes a data model management device 13c in place of the data model management device 13 of the data center 1.

A description is provided of a configuration and operation of the monitoring device 11c. The monitoring device 11c includes a monitoring information item collection unit 111c in place of the monitoring information item collection unit 111 of the monitoring device 11 and also includes a notification unit 113 as an addition when compared with the monitoring device 11. The monitoring information item collection unit 111c functions like the monitoring information item collection unit 111 and also notifies the notification unit 113, after storing a collected monitoring information item in the monitoring information item storage unit 112, of the storage of the monitoring information item. The notification unit 113 obtains that monitoring information item from the monitoring information item storage unit 112 for output to a display data generation unit 134c.

Figure 20:
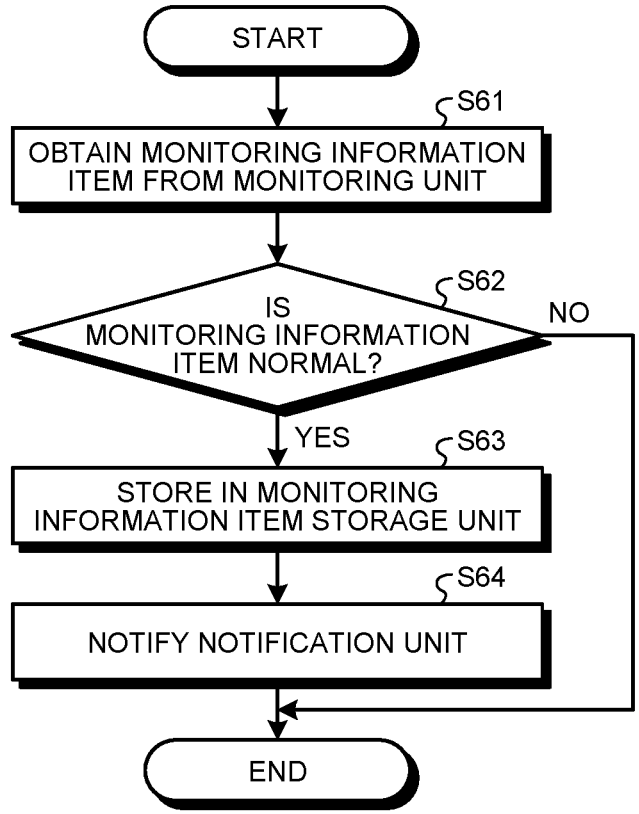
FIG. 20 is a flowchart illustrating a process that a monitoring information item collection unit according to the fourth embodiment carries out for a monitoring information item storage unit and a notification unit when collecting a monitoring information item.

FIG. 20 is a flowchart illustrating a process that the monitoring information item collection unit 111c according to the fourth embodiment carries out for the monitoring information item storage unit 112 and the notification unit 113 when collecting the monitoring information item. Upon obtaining the monitoring information item from the monitoring unit 2 (step S61), the monitoring information item collection unit 111c checks whether the monitoring information item is normal (step S62). If the monitoring information item cannot be obtained normally due to, for example, a communication error (step S62: No), the monitoring information item collection unit 111c ends the process. If the monitoring information item can be obtained normally (step S62: Yes), the monitoring information item collection unit 111c stores the obtained monitoring information item in the monitoring information item storage unit 112 (step S63) and notifies the notification unit 113 that the monitoring information item has been stored in the monitoring information item storage unit 112 (step S64). Every time the monitoring information item collection unit 111c obtains a monitoring information item from the monitoring unit 2, the monitoring information item collection unit 111c carries out the process illustrated by the flowchart in FIG. 20.

Figure 21:
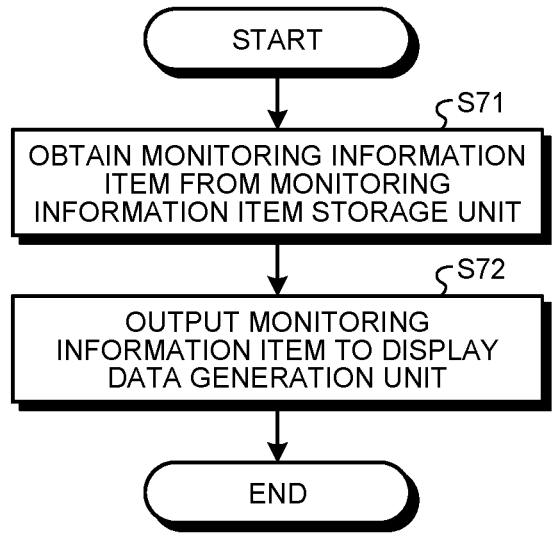
FIG. 21 is a flowchart illustrating a process that the notification unit according to the fourth embodiment carries out to output the monitoring information item to a display data generation unit.

FIG. 21 is a flowchart illustrating a process that the notification unit 113 according to the fourth embodiment carries out to output the monitoring information item to the display data generation unit 134c. When notified by the monitoring information item collection unit 111c that the monitoring information item has been stored, the notification unit 113 obtains that monitoring information item from the monitoring information item storage unit 112 (step S71) and outputs the obtained monitoring information item to the display data generation unit 134c (step S72).

A description is provided next of a configuration and operation of the data model management device 13c. The data model management device 13c includes the display data generation unit 134c in place of the display data generation unit 134 of the data model management device 13 and also includes a display data storage unit 136 as an addition when compared with the data model management device 13. Upon obtaining the monitoring information item from the notification unit 113 of the monitoring device 11c, the display data generation unit 134c generates the display data and stores the generated display data in the display data storage unit 136. The display data storage unit 136 is a storage unit that stores the display data.

Figure 22:
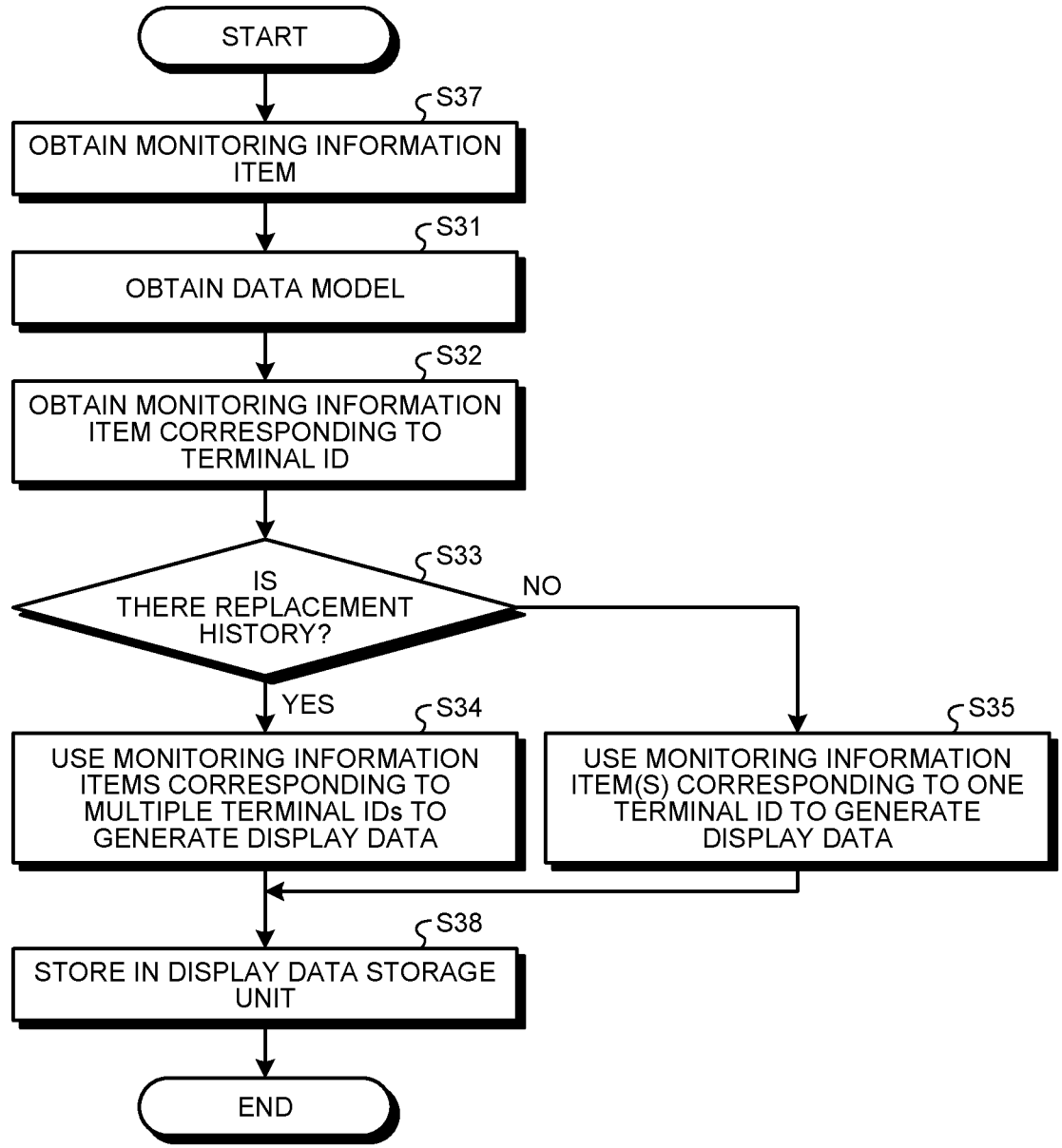
FIG. 22 is a flowchart illustrating a process that the display data generation unit according to the fourth embodiment carries out to generate display data intended for monitoring information item display on the basis of a configuration agreeing with a data model.

FIG. 22 is a flowchart illustrating a process that the display data generation unit 134c according to the fourth embodiment carries out to generate the display data intended for monitoring information item display on the basis of a configuration agreeing with a data model. The display data generation unit 134c first obtains the monitoring information item from the notification unit 113 of the monitoring device 11c (step S37). The display data generation unit 134c generates the display data corresponding to the monitoring information item obtained from the notification unit 113. Steps for display data generation themselves are similar to steps S31 to S35 of the flowchart in FIG. 8 described in the first embodiment. The display data generation unit 134c stores the generated display data in the display data storage unit 136 (step S38). It is to be noted that the display data generation unit 134c may receive, from the notification unit 113, only a notification that the monitoring information item has been collected and may obtain that monitoring information item from the monitoring information item storage unit 112 as in, for example, the first embodiment.

FIG. 23 is a diagram illustrating an example of a fourth table for the display data storage unit 136 according to the fourth embodiment to retain the display data. Items that are set in the fourth table include a monitoring unit ID, a monitoring information item ID, a measured value, and a measurement time point. It is to be noted that while the monitoring information item illustrated in FIG. 23 is a simple example, display data that is actually stored in the display data storage unit 136 enables the display device 12 to display such display details as illustrated in each of FIGS. 9 to 12 explained in the first embodiment.

In the data center 1c, operation of each of the display device 12 and the configuration information item management device 14 is similar to the one in the first embodiment.

As in the case of the first embodiment, the configuration illustrated in FIG. 13 or 14 is used as a hardware configuration for each of the monitoring device 11c and the data model management device 13c.

According to the present embodiment described above, the data model management device 13c of the data center 1c generates and stores the display data when the monitoring information item is collected and thus does not generate the display data when notified by the display device 12. As such, in cases where there are a plurality of the display devices 12 notifying that the monitoring information items that are identical are to be displayed, the display data generation process is not carried out redundantly. Accordingly, the data model management device 13c can have a reduced load of display data generation. Moreover, by generating the display data in advance, the data model management device 13c can achieve reduction of time required for output of the display data to the display device 12 as compared with that of the first, second, or third embodiment in which the display data is generated after receipt of the notification from the display device 12.

Fifth Embodiment

In the first embodiment, for example, display data generation using the data model can be achieved by addition of the data model management device 13 to a monitoring system that originally includes the monitoring device 11, the display device 12, and the configuration information item management device 14. However, there is a simple monitoring system not having the configuration information item management device 14. In a fifth embodiment, a description will be given of a case where the monitoring system not including the configuration information item management device 14 generates display data, using a data model.

Figure 24:
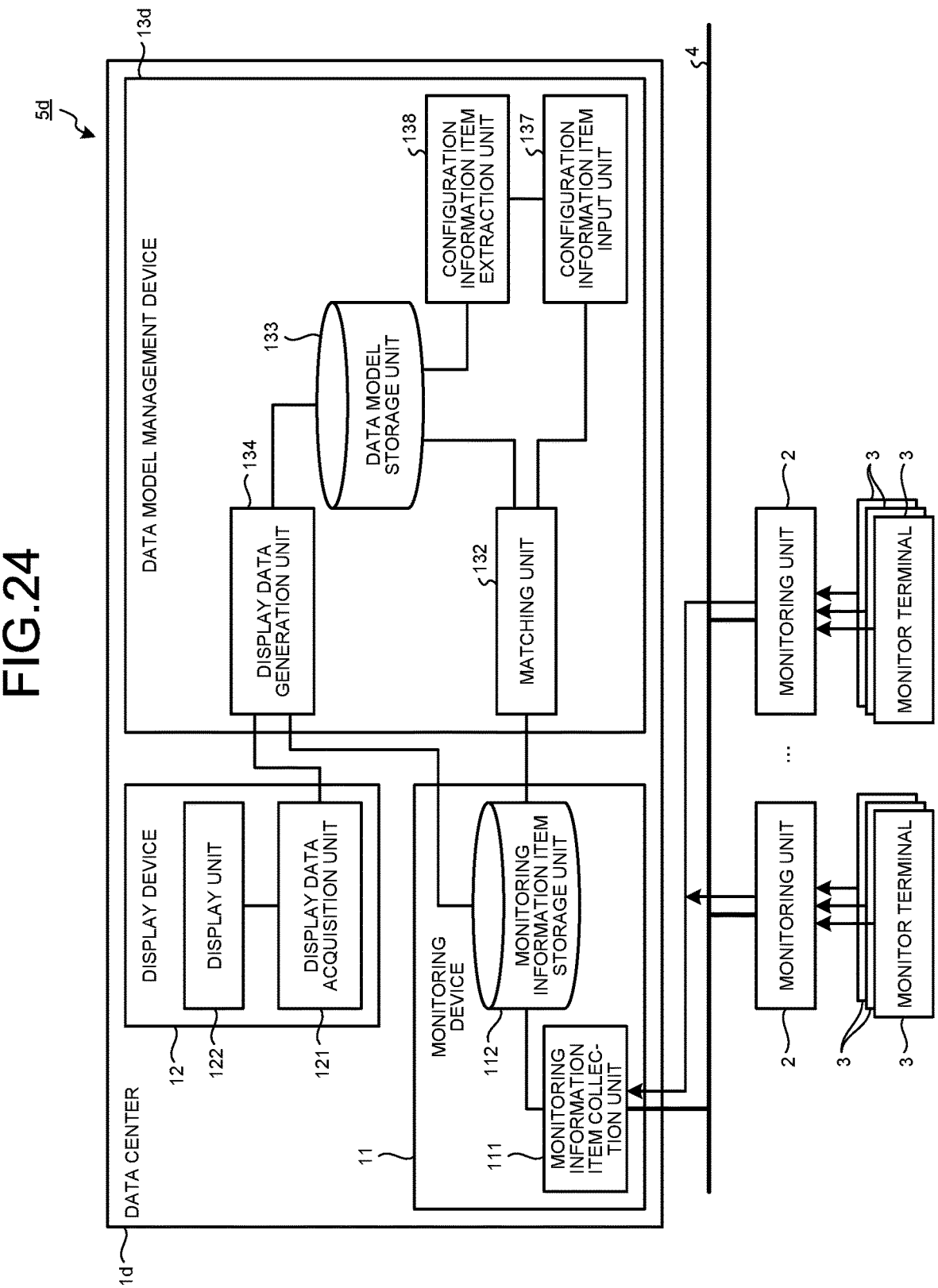
FIG. 24 is a diagram illustrating an example configuration of a monitoring system according to a fifth embodiment.

FIG. 24 is a diagram illustrating an example configuration of a monitoring system 5d according to the fifth embodiment. The monitoring system 5d includes a data center 1d in place of the data center 1 of the monitoring system 5 in the first embodiment illustrated in FIG. 1. The data center 1*d* has the configuration information item management device 14 removed compared with the data center 1 and includes a data model management device 13*d* in place of the data model management device 13 of the data center 1. The data model management device 13*d* generates the display data intended for monitoring information item display by means of the data model that includes information associating a monitoring information item with a configuration information item that is information about the monitor terminal 3 connected to the monitoring system 5*d*.

When compared with the data model management device 13, the data model management device 13*d* has the configuration information item monitoring unit 131 removed and includes a configuration information item input unit 137 and a configuration information item extraction unit 138 as additions. The configuration information item input unit 137 receives, as a user input, a terminal ID and generates a configuration information item. The configuration information item extraction unit 138 extracts, from the data model storage unit 133, a data model relevant to the terminal ID received by the configuration information item input unit 137.

Figure 25:
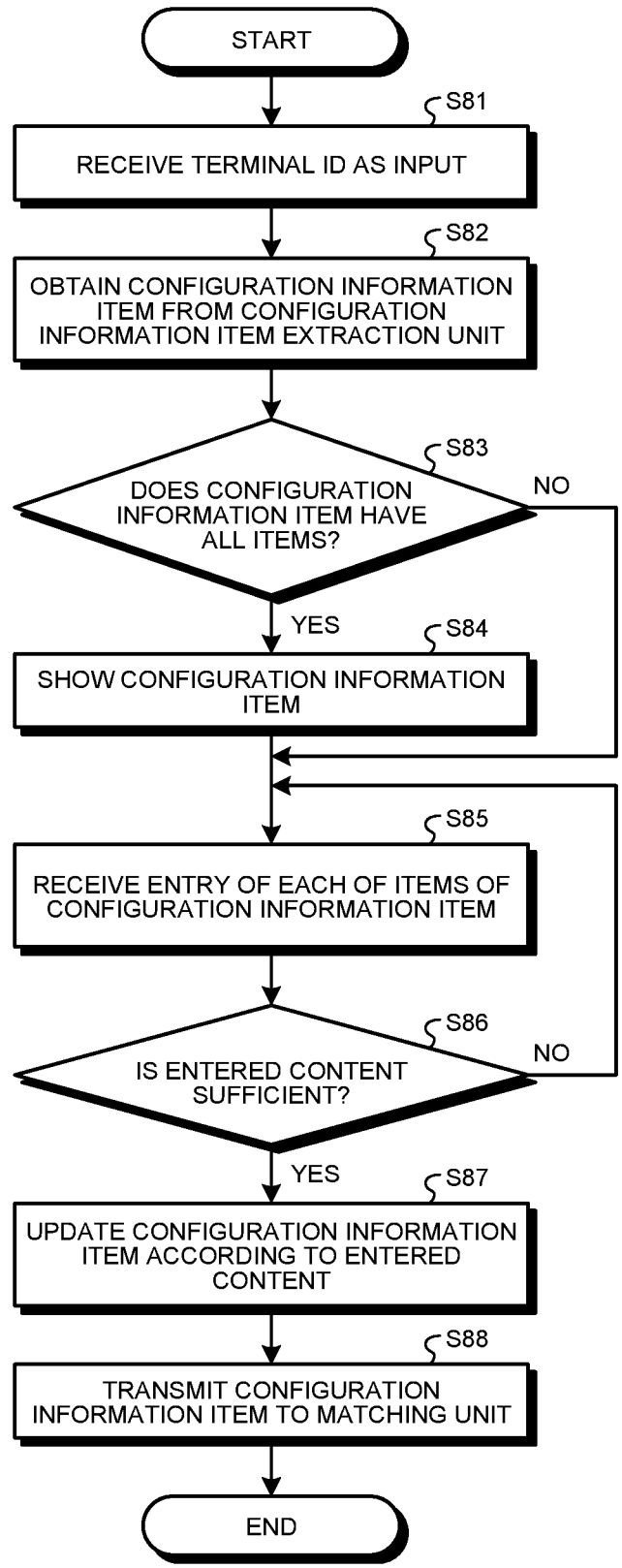
FIG. 25 is a flowchart illustrating a process that a configuration information item input unit according to the fifth embodiment carries out for transmission of updated configuration information item to a matching unit upon receiving a terminal ID as a user input.

FIG. 25 is a flowchart illustrating a process that the configuration information item input unit 137 according to the fifth embodiment carries out for transmission of updated configuration information item to the matching unit 132 upon receiving the terminal ID as the user input. Upon receiving the terminal ID as the user input (step S81), the configuration information item input unit 137 transmits the terminal ID to the configuration information item extraction unit 138 and obtains a configuration information item from the configuration information item extraction unit 138 (step S82). A description is provided later of a process that the configuration information item extraction unit 138 carries out when receiving the terminal ID from the configuration information item input unit 137 to output the configuration information item to the configuration information item input unit 137. Upon obtaining the configuration information item from the configuration information item extraction unit 138, the configuration information item input unit 137 checks whether the configuration information item includes any empty items (step S83).

If the configuration information item has no empty item (step S83: Yes), the configuration information item input unit 137 shows a user the configuration information item that is based on details currently stored in the data model storage unit 133 (step S84). If the configuration information item has any empty items (step S83: No), the configuration information item input unit 137 skips step S84. The configuration information item input unit 137 receives from the user an entry of each of the items of the configuration information item (step S85). If entered content of each of the items is not sufficient (step S86: No), the configuration information item input unit 137 returns to step S85 and continues reception of content of each of the items. If the entered content of each of the items is sufficient (step S86: Yes), the configuration information item input unit 137 updates the configuration information item according to the entered content (step S87). The configuration information item input unit 137 transmits the updated configuration information item to the matching unit 132 (step S88).

Figure 26:
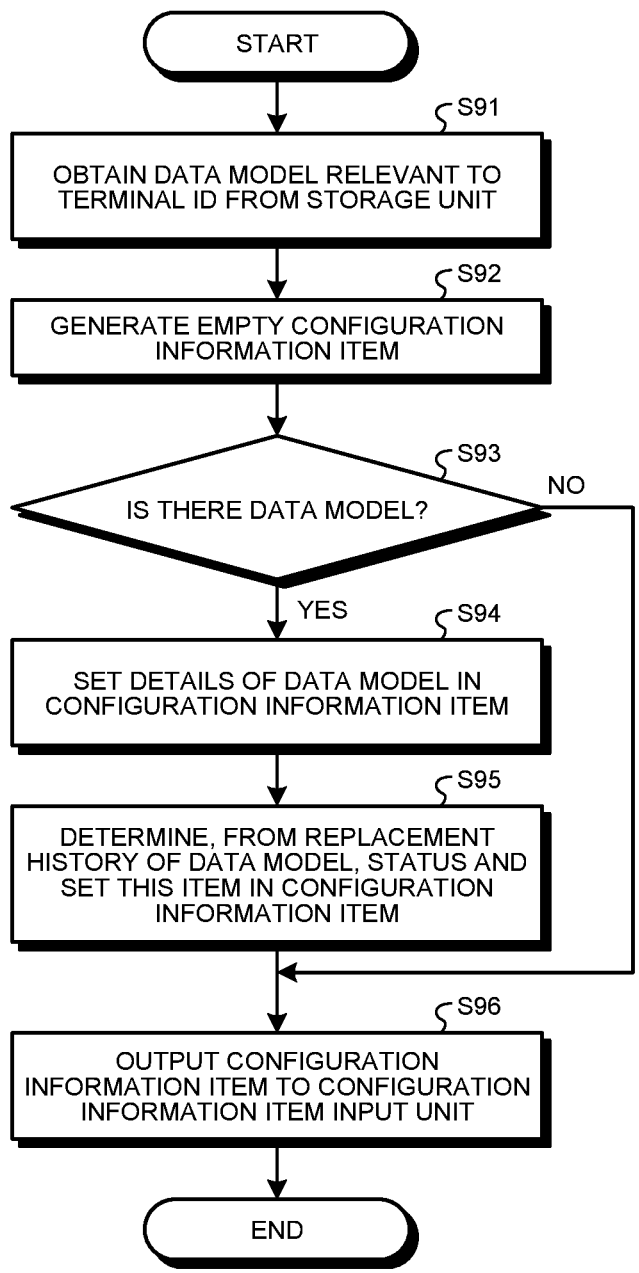
FIG. 26 is a flowchart illustrating a process that a configuration information item extraction unit according to the fifth embodiment carries out to reconstruct a configuration information item from a data model that is in a data model storage unit.

FIG. 26 is a flowchart illustrating a process that the configuration information item extraction unit 138 according to the fifth embodiment carries out to reconstruct the configuration information item from the data model in the data model storage unit 133. Upon receiving the terminal ID from the configuration information item input unit 137, the configuration information item extraction unit 138 obtains the data model relevant to the received terminal ID from the data model storage unit 133 (step S91). The configuration information item extraction unit 138 generates an empty configuration information item (step S92).

If the data model exists or can be obtained from the data model storage unit 133 in step S91 (step S93: Yes), the configuration information item extraction unit 138 sets details of the obtained data model in the configuration information item (step S94). The configuration information item extraction unit 138 determines, from a replacement history that is based on an operation start time point and an operation finish time point that are included in the data model, a status that is an item not included in the data model and sets this complement (step S95). If the data model does not exist or cannot be obtained from the data model storage unit 133 in step S91 (step S93: No), the configuration information item extraction unit 138 skips steps S94 and S95. The configuration information item extraction unit 138 outputs the generated configuration information item to a request source, namely, the configuration information item input unit 137 (step S96).

In the data model management device 13*d*, operation of each of the matching unit 132 and the display data generation unit 134 is similar to the one in the first embodiment. In the data center 1*d*, operation of each of the monitoring device 11 and the display device 12 is similar to the one in the first embodiment.

A hardware configuration for the data model management device 13*d* includes, in addition to the configuration in FIG. 13 or the configuration in FIG. 14, an input unit that receives the user-entered content of the configuration information item, such as a mouse or a keyboard.

According to the present embodiment described above, the data model management device 13*d* of the data center 1*d* receives the user input and generates the configuration information item that is retained in the first embodiment by the configuration information item management device 14. As such, even without a device that collects the configuration information item, the data center 1*d* can generate the display data by means of the data model in the monitoring system 5*d* by allowing the user to set the configuration information item. Moreover, the data center 1*d* can achieve an inexpensive configuration not requiring the configuration information item management device 14.

The above configurations illustrated in the embodiments are examples of an aspect of the present invention, can be combined with other techniques that are publicly known or can be partly omitted or changed without departing from the gist of the present invention.

REFERENCE SIGNS LIST

1, 1*a*, 1*b*, 1*c*, 1*d* data center; 2 monitoring unit; 3 monitor terminal; 4 network; 5, 5*a*, 5*b*, 5*c*, 5*d* monitoring system; 11, 11*c* monitoring device; 12 display device; 13, 13*b*, 13*c*, 13*d* data model management device; 14, 14*a* configuration information item management device; 111, 111*c* monitoring information item collection unit; 112 monitoring information item storage unit; 113 notification unit; 121 display data acquisition unit; 122 display unit; 131 configuration information item monitoring unit; 132 matching unit; 133 data model storage unit; 134, 134*c* display data generation unit; 135 editing unit; 136 display data storage unit; 137, 141 configuration information item input unit; 138 configuration information item extraction unit; 142 configuration information item storage unit; 143 configuration information item collection unit.

The invention claimed is:

1. A monitoring system comprising:
a monitoring device that collects a monitoring information item from a monitoring unit, said monitoring information item is a measured value that is a result of monitoring by a monitor terminal connected to the monitoring system;
a configuration information item management device that retains a configuration information item about the monitor terminal, said configuration information item being different from said monitoring information item collected and retained by the monitoring device and including information about an operation status of the monitor terminal connected to the monitoring system;
a data model management device that generates, using a data model, display data for display of the monitoring information item, wherein the data model includes information that associates the monitoring information item collected and retained by the monitoring device with the configuration information item retained by the configuration information item management device; and
a display device that obtains the display data, from the data model management device, and controls the display of the monitoring information item.

2. The monitoring system according to claim 1, wherein the data model management device includes:
a configuration information item monitor to monitor the configuration information item retained by the configuration information item management device;
a matcher to change the data model when the configuration information item changes; and
a display data generator to generate the display data on a basis of the data model.

3. The monitoring system according to claim 2, wherein the data model management device further includes an editor to edit, upon receiving a user input, a detail of the data model.

4. The monitoring system according to claim 2, wherein
the data model management device further includes a display data storage to retain the display data, and
the display data generator generates the display data upon obtaining the monitoring information item from the monitoring device and stores the generated display data in the display data storage.

5. The monitoring system according to claim 1, wherein the configuration information item management device includes:
a configuration information item receiver to generate the configuration information item upon receiving a user input regarding the operation status of the monitor terminal; and
a configuration information item storage to store the configuration information item.

6. The monitoring system according to claim 1, wherein the configuration information item management device includes:
a configuration information item collector to collect operation status of the monitor terminal and to generate the configuration information item; and
a configuration information item storage to store the configuration information item.

7. A monitoring system comprising:
a monitoring device that collects a monitoring information item from a monitoring unit, said monitoring information item is a measured value that is a result of monitoring by a monitor terminal connected to the monitoring system;
a data model management device that generates, using a data model, display data for display of the monitoring information item, wherein the data model includes information that associates the monitoring information item collected and retained by the monitoring device with a configuration information item that is different from said monitoring information item and includes information about an operation status of the monitor terminal connected to the monitoring system; and
a display device that obtains the display data, from the data model management device, and controls the display of the monitoring information item.

8. The monitoring system according to claim 7, wherein the data model management device includes:
a configuration information item receiver to generate the configuration information item upon receiving a user input regarding operation status of the monitor terminal;
a matcher to change the data model when the configuration information item changes; and
a display data generator to generate the display data on a basis of the data model.

9. A data model management device comprising:
a configuration information item monitor that monitors a configuration information item about a monitor terminal connected to a monitoring system, said configuration information item being retained in a configuration information management device, separate from said data model management device, and including information about an operation status of the monitor terminal;
a matcher to change a data model when the configuration information item changes, (i) wherein the data model includes information associating a monitoring information item that is collected and retained by a monitoring device with the configuration information item retained by the configuration information item management device, and (ii) wherein the monitoring information item is different from the configuration information item and is a measured value that is a result of monitoring by the monitor terminal; and
a display data generator to generates, using the data model, display data for display of the monitoring information item.

10. The data model management device according to claim 9, further comprising an editor to edit, upon receiving a user input, a detail of the data model.

11. The data model management device according to claim 9, further comprising a display data storage to retain the display data, wherein
the display data generator generates the display data upon obtaining the monitoring information item from the monitoring device and stores the generated display data in the display data storage.

12. A data model management device comprising:
a configuration information item receiver that generates a configuration information item upon receiving a user input regarding operation status of a monitor terminal connected to a monitoring system, the configuration information item being information about the monitor terminal connected to the monitoring system;

a matcher that changes a data model when the configuration information item changes, (i) wherein the data model includes information associating a monitoring information item that is collected and retained by a monitoring device with the configuration information item generated by the configuration information item receiver, and (ii) wherein the monitoring information item is different from the configuration information item and is a measured value that is a result of monitoring by the monitor terminal; and a display data generator that generates, using the data model, display data for display of the monitoring information item.

13. A method of generating display data, the method comprising:

monitoring, by a configuration information item monitor of a data model management device, a configuration information item about a monitor terminal connected to a monitoring system, said configuration information item being retained in a configuration information management device, separate from said data model management device, and including information about an operation status of the monitor terminal;

changing, by a matcher of the data model management device, a data model when the configuration information item changes, (i) wherein the data model includes information associating a monitoring information item that is collected and retained by a monitoring device with the configuration information item retained by the configuration information item management device, and (ii) wherein the monitoring information item is different from the configuration information item and is a measured value that is a result of monitoring by the monitor terminal; and generating, by a display data generator, using the data model, display data for display of the monitoring information item.

14. The method of generating display data according to claim 13, further comprising editing, upon receipt of a user input, a detail of the data model.

15. The method of generating display data according to claim 13, wherein the generating includes generating the display data upon obtaining the monitoring information item from the monitoring device and storing the generated display data in a display data storage.

16. A method of generating display data, the method comprising:

generating, by a configuration information item receiver of a data model management device, a configuration information item upon receipt of a user input regarding operation status of a monitor terminal connected to a monitoring system, the configuration information item being information about the monitor terminal connected to the monitoring system;

changing, by matcher of the data model management device, a data model when the configuration information item changes, (i) wherein the data model includes information associating a monitoring information item that is collected and retained by a monitoring device with the configuration information item generated by the configuration item receiver, and (ii) wherein the monitoring information item is different from the configuration information item and is a measured value that is a result of monitoring by the monitor terminal; and generating, by a display data generator of the data model management device, using the data model, display data for display of the monitoring information item.

\* \* \* \* \*